(12) United States Patent  
Omoto et al.

(10) Patent No.: US 6,922,379 B2
(45) Date of Patent: Jul. 26, 2005

(54) DISK CHANGER APPARATUS

(75) Inventors: Hideo Omoto, Hamamatsu (JP); Hisanobu Suzuki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 377 days.

(21) Appl. No.: 10/315,450

(22) Filed: Dec. 10, 2002

(65) Prior Publication Data

US 2003/0107960 A1 Jun. 12, 2003

(30) Foreign Application Priority Data

Dec. 10, 2001 (JP) .................................... 2001-375920

(51) Int. Cl.$^7$ ............................................ G11B 7/085
(52) U.S. Cl. .................................................. 369/30.85
(58) Field of Search ...................................... 369/30.85

(56) References Cited

U.S. PATENT DOCUMENTS

2001/0055267 A1 * 12/2001 Shimizu et al. ............. 369/200
2003/0048702 A1 * 3/2003 Kajiyama et al. ........ 369/30.86

* cited by examiner

*Primary Examiner*—George J. Letscher
(74) *Attorney, Agent, or Firm*—Pillsbury Winthrop Shaw Pittman LLP

(57) ABSTRACT

Disk changer apparatus employs a commercially-available drive device that includes a sliding tray having an opening preformed therein. Disk elevator section has a portion movable through the opening of the sliding tray and thereby allows a disk to be transferred between a disk transport section and the sliding tray of the drive device utilizing the opening of the sliding tray.

4 Claims, 26 Drawing Sheets

DISK CHANGER APPARATUS

BACKGROUND OF THE INVENTION

The present invention relates generally to disk changer apparatus for storing a plurality of disk-shaped recording media, such as CDs (Compact Disks) and DVDs (Digital Versatile Disks), and performing information reproduction or recording on a desired or designated of the stored disk-shaped recording media.

There have been known disk changer apparatus for storing a plurality of disk-shaped recording media (hereinafter called "disks"), such as CDs and DVDs, and performing information reproduction or recording on a designated one of the stored disks, and such disk changer apparatus have been used in commercial-use communication karaoke apparatus, database systems, private-use AV (Audio-Visual) equipment, etc. For example, the disk changer apparatus employed in communication karaoke apparatus, which store a plurality of disks having image data recorded thereon, perform operations for reading out the image data from a designated one of the stored disks and outputting image signals indicative of lyrics and background pictures to a performance of a karaoke music piece.

As illustratively shown in FIGS. 22 to 24, a typical example of the disk changer apparatus 200 includes a disk storage section 210 for storing a plurality of disks D supported on respective trays 201, a drive section 220 for reproducing or recording desired information from or to a designated one of the stored disks, and a disk transport section 230 for transporting a designated disk between the disk storage section 210 and the drive section 220.

Specifically, when a designated one of the disks D stored in the disk storage section 210 is to be drawn out from the storage section 210 and reproduced or recorded by the drive section 220, the disk transport section 230 moves upward to the stored position of the designated disk D as represented by an upward arrow of FIG. 22 and then pulls out and holds the designated disk D and corresponding tray 201 in the interior of the transport section 230 as illustrated in FIG. 23. As illustrated in FIG. 24, the disk transport section 230 then moves downward to a predetermined position, where the disk D held therein is loaded from the transport section 230 onto a turntable 221 of the drive section 220 with a damper 231 of the disk transport section 230 preventing the disk D from being accidentally fall off or detached from the turntable 221. Once the disk D has been appropriately loaded and set on the turntable 221, a spindle motor 222 of the drive section 220 is rotated, so that an optical pickup 223 reads out information recorded on the disk D or writes information onto the disk D. The disk D transported to the drive section 220 in the above-mentioned manner can be returned to a desired location (e.g., originally allocated position) of the disk storage section 210 by the disk transport section 230 reversing the above-mentioned operations.

Some of the disk changer apparatus employ, as their internal disk drive section, a commercially-available tray-type drive device 250 as illustratively shown in FIG. 25. In this case, modifications or adaptations are made on the commercially-available tray-type drive device 250 so as to permit insertion and withdrawal of the tray (hereinafter also referred to as a "carrying tray" where necessary to clearly distinguish from a sliding tray 252 of the drive section 220) 201 of the disk D, e.g. by removing the sliding tray 251 and front panel 252 of the drive device 250 and adding therefor tray guides 253 etc. as illustrated in FIG. 26. The drive device 250 is also modified to include a means for detecting insertion and withdrawal of the sliding tray 251.

In the disk changer apparatus 300 employing such a modified drive device 250, as illustrated in FIGS. 27 to 31, the disk transport section 230 moves upward to the stored position of a designated disk D to be take out of the disk storage section 210 (see FIG. 27), and then pulls out and holds the designated disk D and corresponding tray 201 in the interior of the transport section 230 (see FIG. 28). After that, the disk transport section 230 with the designated disk D and corresponding tray 201 held therein moves downward to a position facing a tray inserting opening of the drive device 250 (see FIG. 29) and inserts the carrying tray 201 into the interior of the drive device 250 through the tray inserting opening (see FIG. 30). Then, the drive device 250 detects the insertion of the carrying tray 201 and activates an optical pickup unit 260, so that the disk D is set on the turntable for reading/writing of information.

The disk changer apparatus 300, employing the commercially-available drive device 250 as its drive section 220, has various advantages; for example, the disk changer apparatus 300 can eliminate the need to design the drive section 220 for dedicated use by the changer apparatus as in the case of the first-mentioned conventional disk changer apparatus 200 and can select an optimum drive device from among various commercially-available drive devices.

However, to manufacture disk changer apparatus using a commercially-available drive device, it is necessary to obtain modifying parts, such as the above-mentioned tray guides, that are fit for the disk changer apparatus to be manufactured. It generally takes several months to design such modifying parts and make molds for the modifying parts. Thus, there would be a significant time lag of at least several months between the time when the drive device 250 to be used is selected and the time when manufacturing of the disk changer apparatus is actually initiated.

In fact, however, production of the commercially-available drive devices is often limited to a short period in order to meet rapidly-changing market demands for more improved functions (especially, increased operating speed); production of many of various models tends to be discontinued within less than one year from the initiation of the production, with production of some of the models being discontinued within half year or so. Therefore, there is a possibility that production of the selected drive device has already been discontinued when manufacturing of the disk changer apparatus is to be actually initiated. To address such problems, it has been necessary to previously secure a considerable number of the selected drive devices in stock. Also, under the circumstances, it has not been possible to flexibly deal with any change in a production plan of the disk changer apparatus.

Further, when the drive device of the disk changer apparatus has to be replaced with another one due to a breakdown or the like of the drive device, it is necessary to manufacture modifying parts for the new drive device, which would require a long repair time and thus cause inconveniences to the user. In such a case, a manufacturer tends to make modifying parts of insufficient durability, performance etc. with a view to finishing the repair as soon as possible, which would cause further inconveniences to the user. In addition, because the drive devices are being improved today at rapid speed as noted above, both of the manufactures and users of the disk changer apparatus may greatly benefit if there is devised a novel technique to allow the drive device of the disk changer apparatus to be readily replaced with a latest model, and it is believed that such a novel technique will highly contribute to enhancement of a product value of the disk changer apparatus.

SUMMARY OF THE INVENTION

In view of the foregoing, it is an object of the present invention to provide a novel disk changer apparatus which can readily employ a commercially-available drive device and also allows the drive device to be readily replaced with another drive device.

To accomplish the above-mentioned object, the present invention provides a disk changer apparatus which comprises: a drive device for reading or writing information from or to a disk loaded on a sliding tray of the drive device by irradiating a light beam onto the disk through an opening formed in the sliding tray; a disk storage section for storing a plurality of disks supported on respective carrying trays; a tray keeping section for temporarily keeping the carrying tray of a given disk; a first transport section that receives, from the disk storage section, a designated disk along with the respective carrying tray supporting thereon the designated disk and then transports the designated disk and respective carrying tray to a predetermined position adjacent to the tray keeping section to thereby pass the carrying tray of the designated disk to the tray keeping section; and a second transport section that receives only the designated disk from the first transport section having transported the designated disk and respective carrying tray to the predetermined position, and then passes the designated disk to the sliding tray of the drive device.

In an embodiment, when the first transport section passes the carrying tray of the designated disk to the tray keeping section, the second transport section separates the designated disk from the respective carrying tray so that the second transport section can receive only the designated disk and the tray keeping section can keep only the carrying tray of the designated disk.

Further, when the sliding tray is in an advanced position projecting from the drive device, the second transport section is movable through the opening of the sliding tray to permit transfer of the designated disk between the first transport section and the sliding tray.

Preferably, each of the carrying trays has an opening formed therein to extend from the center of the disk to be supported thereon to an outer peripheral edge portion of the disk.

According to the present invention, the second transport section receives only the designated disk, of the pair of the designated disk and corresponding tray which the first transport section has received and transported from the disk storage section, and then delivers the designated disk to the sliding tray of the drive device. In this way, the designated disk can be transported from the disk storage section to the drive device. In this case, when the first transport section passes the designated disk and corresponding tray to the tray keeping section, the second transport section separates the designated disk from the corresponding tray, so that the first transport section allows only the tray to be received in the tray keeping section and accordingly the second transport section can receive only the designated disk.

Further, because the second transport section can pass through the opening formed in the sliding tray of the drive device to thereby permit delivery of the designated disk between the first transport section and the sliding tray, the present invention can transport the designated disk to the commercially-available drive device, utilizing the opening previously formed in the sliding tray of the drive device.

The following will describe embodiments of the present invention, but it should be appreciated that the present invention is not limited to the described embodiments and various modifications of the invention are possible without departing from the basic principles of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

Figure 1:
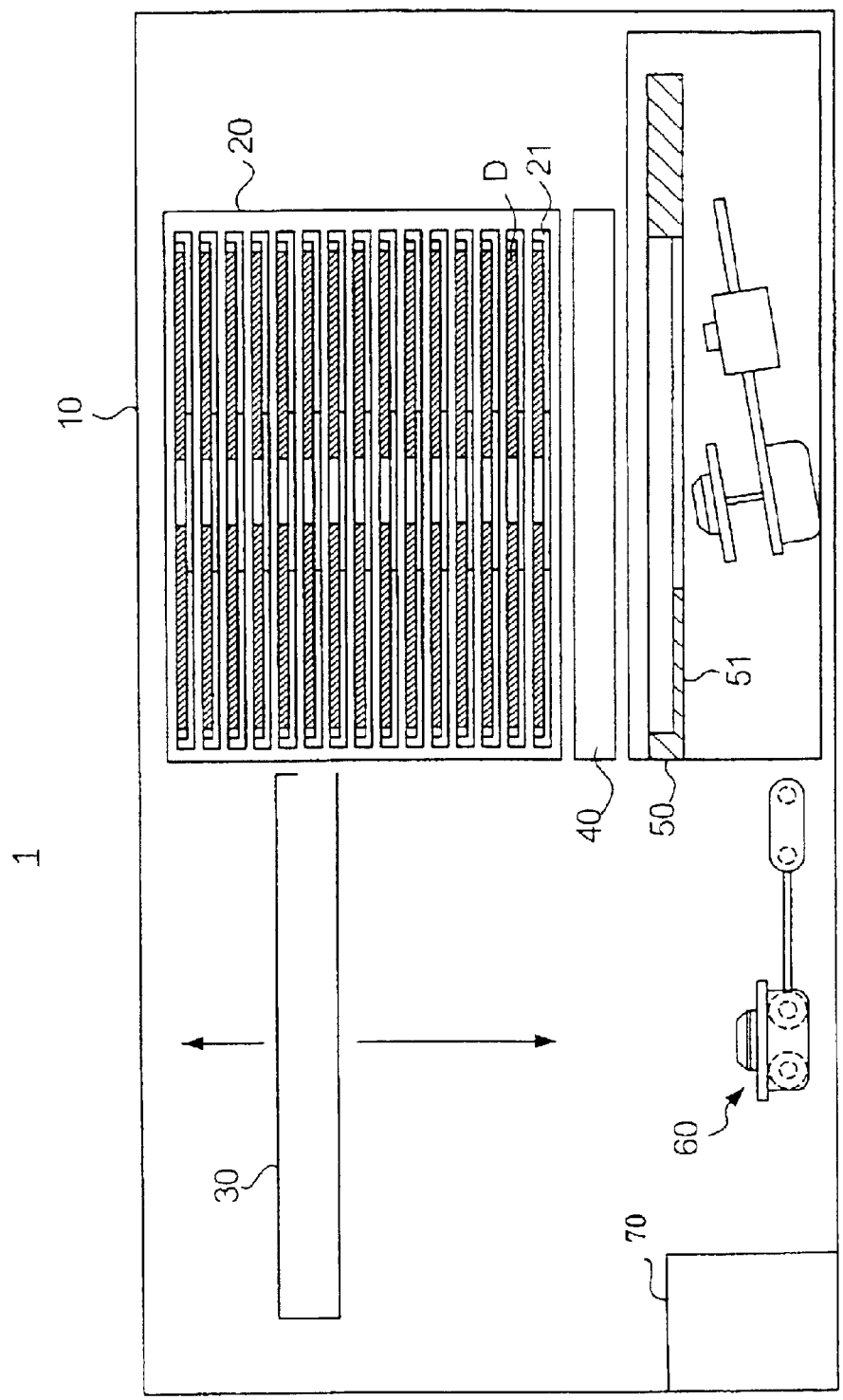
FIG. 1 is a view showing a general setup of a disk changer apparatus in accordance with an embodiment of the present invention.

DETAILED DESCRIPTION OF THE INVENTION (1) Embodiment (1.1) Construction of the Embodiment:

FIG. 1 is a view showing a general setup of a disk changer apparatus 1 in accordance with an embodiment of the present invention. As shown, the disk changer apparatus 1 includes a housing 10, and a disk storage section 20, disk transport section 30, temporary tray keeping section 40, drive device 50 and disk elevator (disk hoisting and lowering) section 60 accommodated in the housing 10. The disk changer apparatus 1 also includes a control section 70 for controlling the components of the apparatus 1.

Figure 2:
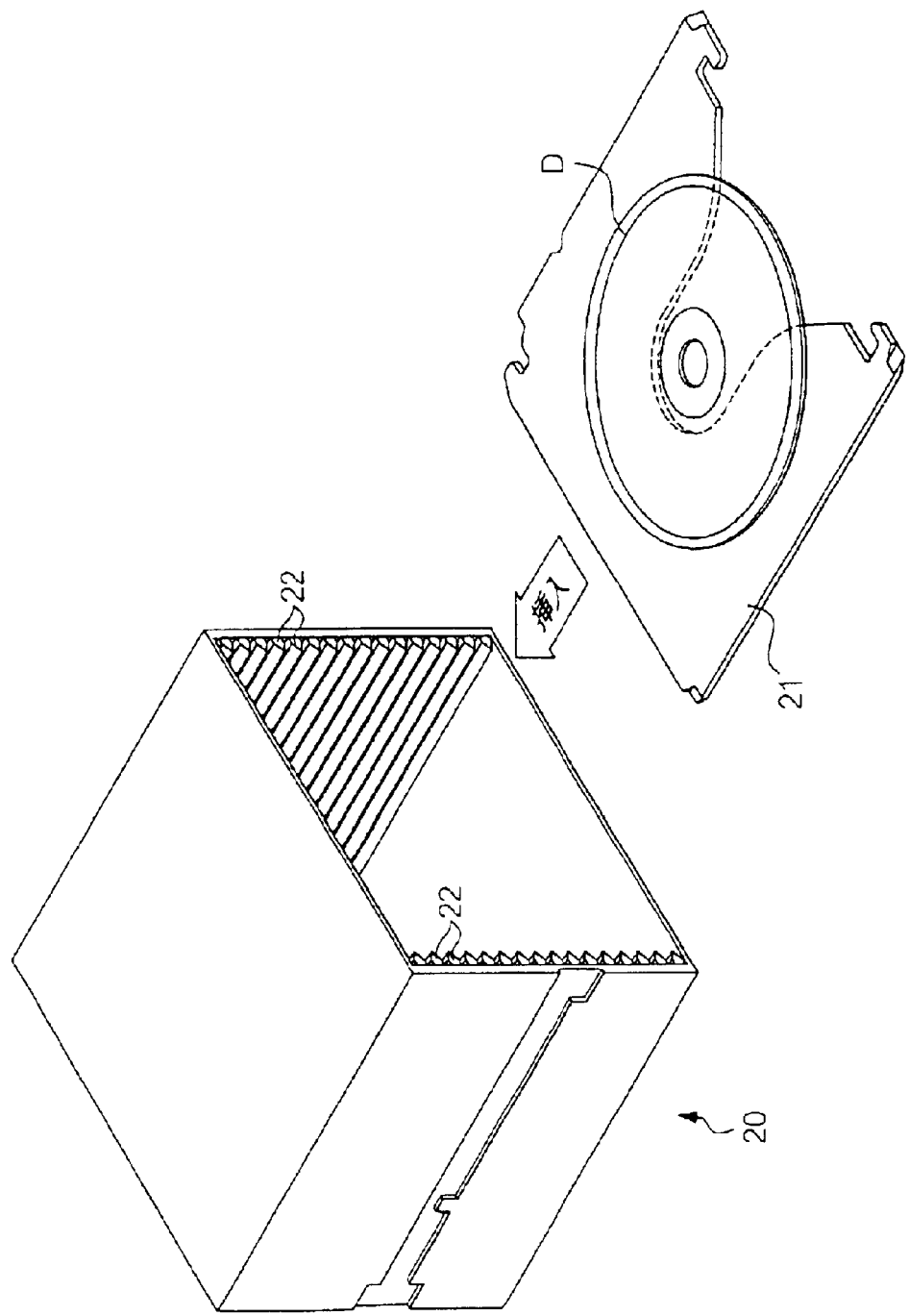
FIG. 2 is a perspective view showing a disk storage section of the disk changer apparatus of FIG. 1.

In the disk changer apparatus 1 of FIG. 1, the disk storage section 20 is in the form of a so-called "disk magazine", which stores a plurality of disks D, such as CDs or DVDs, supported on respective carrying trays 21. As seen in a perspective view of FIG. 2, the disk storage section 20 has a box-shaped frame opening to a transport path of the disk transport section 30 and a plurality of parallel pairs of opposed tray guides 22 provided within the frame, so that a plurality of trays 21 can be inserted and withdrawn in and from the storage section 20 along the respective pairs of opposed tray guides 22. The disk storage section 20 also includes a tray lock mechanism to prevent the inserted trays 21 from falling off the storage section 20, e.g. during transportation of the disk changer apparatus 1. Although not described in detail, the tray lock mechanism has a lock canceling mechanism to cancel a tray lock for a particular tray 21 when the particular tray 21 is to be moved out of the disk storage section 20.

Figure 3:
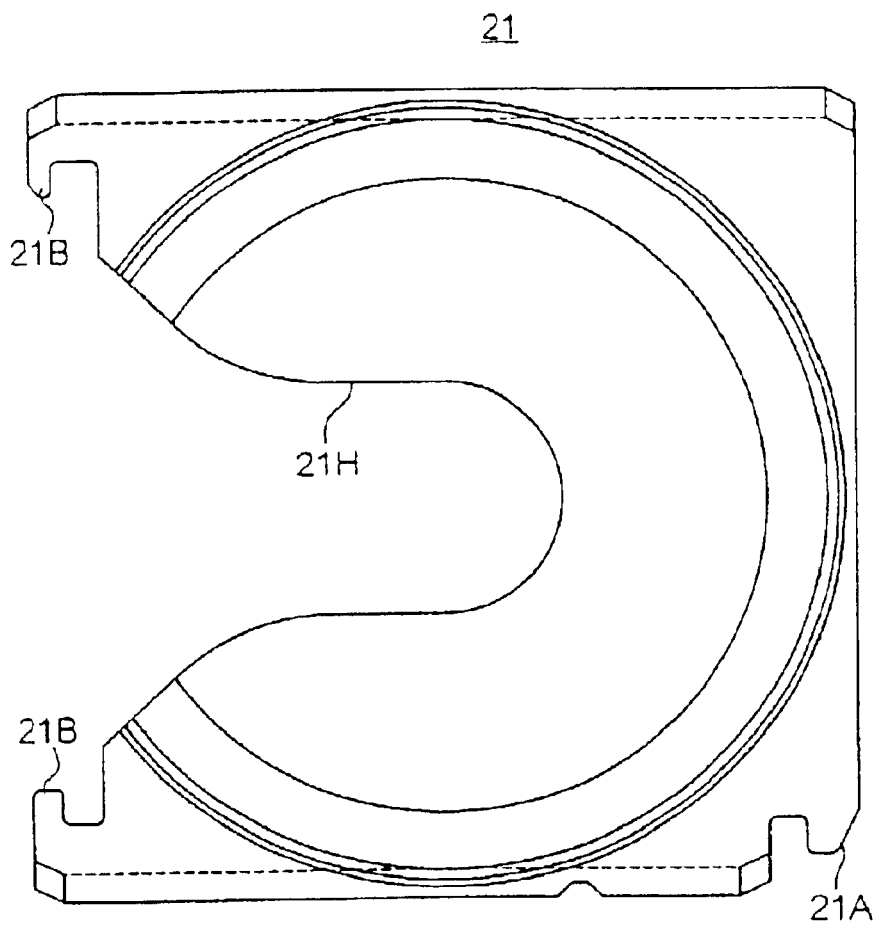
FIG. 3 is a plan view showing a carrying tray of the disk changer apparatus.

FIG. 3 is a plan view of the tray 21, where it is seen that the tray 21 is generally in the form of a flat plate having an opening 21H formed through the thickness thereof and extending from a substantial center of a disk-supporting surface to a circumferential edge portion of the disk-supporting surface. The disk-supporting surface is formed as a slightly depressed surface, corresponding in shape to a disk D to be supported thereon, so that the disk D can be accurately held on the tray 21 in a stable fashion.

Further, the tray 21 includes a locking claw 21A engageable with predetermined elements of the disk storage section 20 as the tray 21 is inserted (from the right in the figure), along the tray guides 22, to a predetermined rear position within the disk storage section 20, and claws 21B to be used when the tray 21 is to be transported as will be set forth below.

Referring back to FIG. 1, the disk storage section 20 is positioned with its front end opening facing leftward; however, the disk storage section 20 can be removed out of the housing 10 by a user manipulating a predetermined operating switch (not shown). By thus removing the disk storage section 20 out of the housing 10, the user can store a desired disk D into the disk storage section 20 or replace a particular disk D stored in the storage section 20 with another disk D. Note that the tray lock mechanism of the disk storage section 20 can also be manually released from a locking state by the user.

The disk transport section 30 is disposed near the front end opening of the disk storage section 20 for vertical movement along the front end of the disk storage section 20 via an elevator mechanism. Specifically, the disk transport section 30 in the instant embodiment is vertically movable at least between a position facing the highest tray 21 of the disk storage section 20 and a position facing the temporary tray keeping section 40 (hereinafter referred to as a "tray delivery position"). In the instant embodiment, a current vertical position of the disk transport section 30 can be identified by the control section 70 on the basis of a detection signal from a not-shown sensor, or on the basis of a rotational angle of a motor driving the elevator mechanism or the number of pulses supplied to the driving motor.

Figure 4:
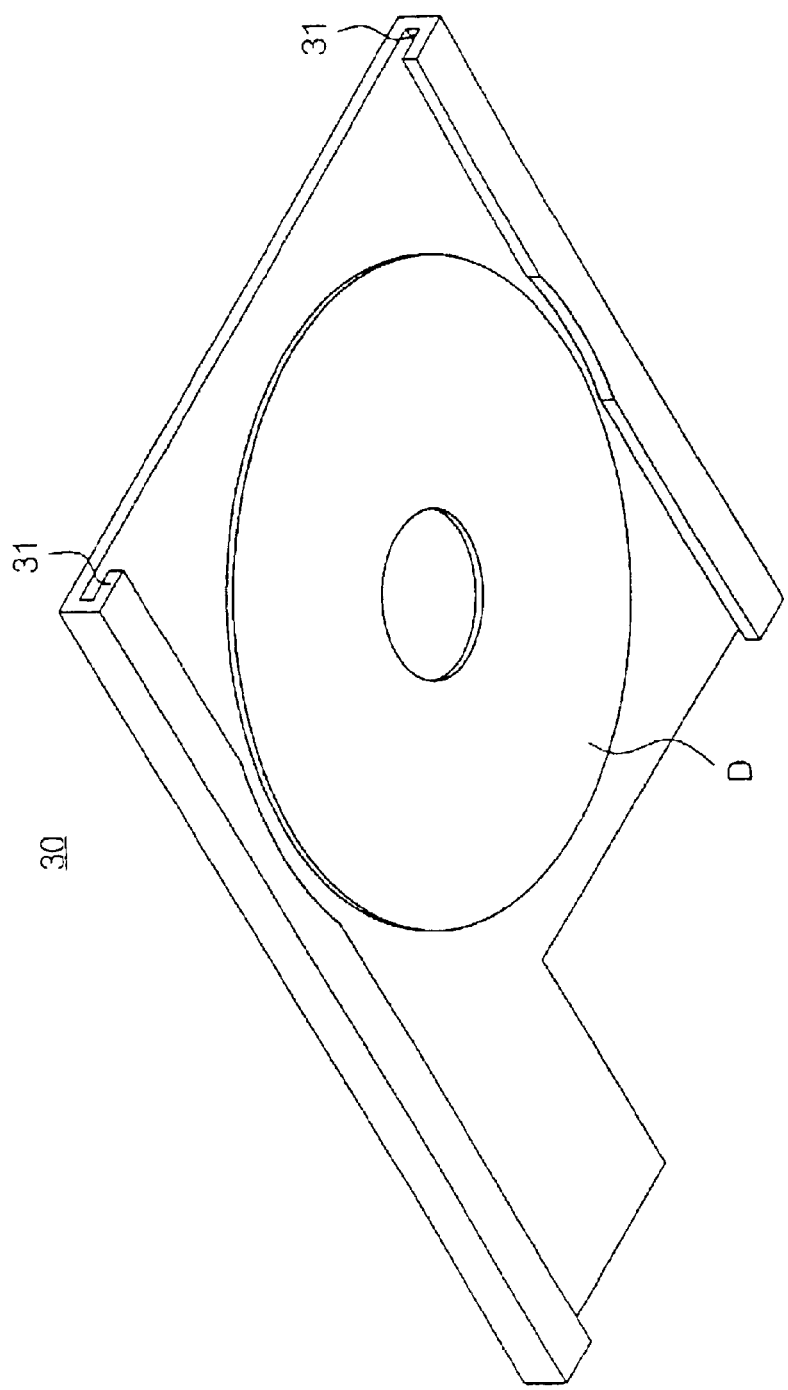
FIG. 4 is a perspective view showing a disk transport section of the disk changer apparatus.

The disk transport section 30 contains a tray transfer mechanism and can transfer a designated tray 21 horizontally (in a left-and-right direction in the figure) by causing hooks of the tray transfer mechanism to engage the claws 21B of the tray 21. This way, the disk transport section 30 permits transfer of the designated tray 21 between the disk storage section 20 and the temporary tray keeping section 40. FIG. 4 is a perspective view of the disk transport section 30 as taken from the interior of the section 30. As shown in FIG. 4, the disk transport section 30 has tray guides 31 formed on its opposed sides so as to hold the tray 21 on its inner surface. Note that the figure shows a position of a disk D when the tray 21 having the disk D supported thereon is received in the disk transport section 30.

The disk transport section 30 further includes a detection mechanism for detecting, via a photo sensor or other type of sensor, a position of the tray 21 received in the disk transport section 30. Thus, the detection mechanism detects whether or not the disk 21 has been completely received in the disk transport section 30 and whether the received tray 21 has been moved out of the disk transport section 30. Each detection by the detection mechanism of the disk transport section 30 is informed to the control section 70.

As seen in FIG. 1, the temporary tray keeping section 40 is disposed below the disk storage section 20. The temporary tray keeping section 40 temporarily stores the tray 21 of a designated disk D that is to be transported to the drive device 50; namely, the temporary tray keeping section 40 temporarily keeps the tray 21 while the designated disk D is being driven by the drive device 50 for information reproduction or recording from or to the disk D.

The drive device 50 in the instant embodiment is a commercially-available drive device, such as a commercially-available CD-ROM drive, CD-R/RW drive, DVD-ROM drive or DVD-RAM drive, and the drive device 50 is disposed below the temporary tray keeping section 40. Generally, the commercially-available drive devices known today can be classified into two major types: a tray type which allows a disk D to be moved into and out of the drive device via a sliding tray; a slot type which allows a disk D to be moved into and out of the drive device in a direct manner without using a sliding tray; and a caddy type which allows a disk D to be moved into and out of the drive device in a dedicated cartridge. The instant embodiment employs the tray-type drive device that is being used most popularly today.

As further seen in FIG. 1, the disk elevator section 60 may be disposed somewhere in a space between the sliding tray 51 of the drive device 50 in a predetermined advanced or disk takeout position and the bottom surface of the housing 10. The disk elevator section 60 will be detailed below, assuming that the elevator section 60 is fixed on the bottom surface of the housing 10.

Figure 5:
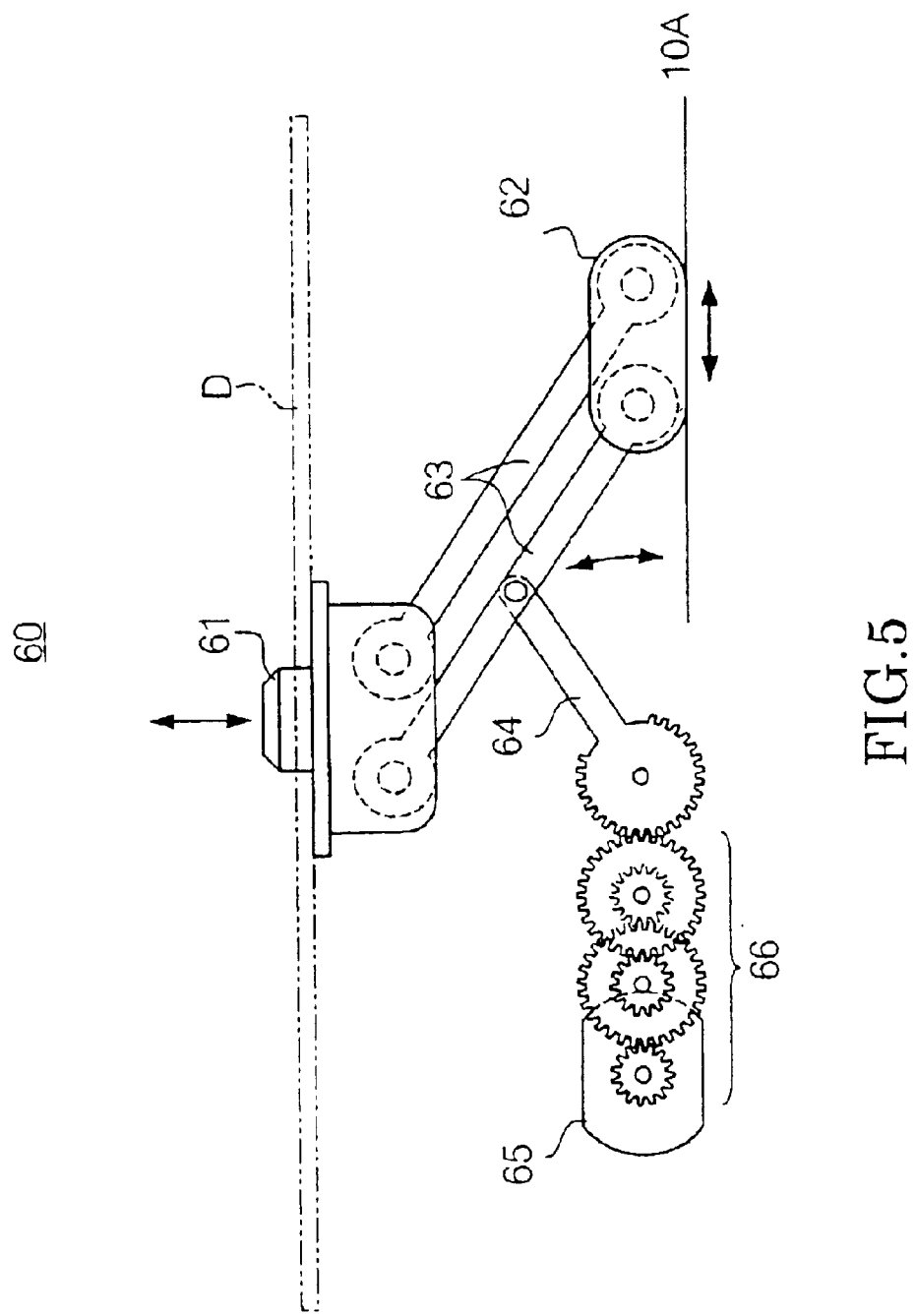
FIG. 5 is a view explanatory of construction and behavior of a disk elevator section of the disk changer apparatus.

As shown in FIG. 5, the disk elevator section 60 includes a disk holding portion 61 capable of fitting in a center hole of the disk D to thereby hold the disk D, a slider 62 movable horizontally in the left-and-right direction of the figure along the bottom surface 10A of the housing 10, and hoisting/lowering levers 63 rotatably connected at their respective one ends to the disk holding portion 61 and rotatably connected at their respective other ends to the slider 62. The disk elevator section 60 also includes a gear lever 64 rotatably connected at one end to a substantial middle part of one of the hoisting/lowering levers 63, and a speed reduction mechanism 66 for slowing down rotations of driving motors 65 to thereby transmit the thus slowed-down rotations to the gear lever 64.

In this disk elevator section 60, the above-mentioned disk holding portion 61, slider 62 and hoisting/lowering levers 63 together constitute a parallel link mechanism. Thus, as the gear lever 64 is rotated via the motors 65 as represented by an arrow, the parallel link mechanism causes the slider 62 to move in the horizontal or left-and-right direction along the bottom surface 10A of the housing 10 and also causes the disk holding portion 61 to move in the vertical or up-and-down direction. In the instant embodiment, the disk holding portion 61 is controlled to move between a lowermost position shown in FIG. 6 and an uppermost position shown in FIG. 7.

Figure 6:
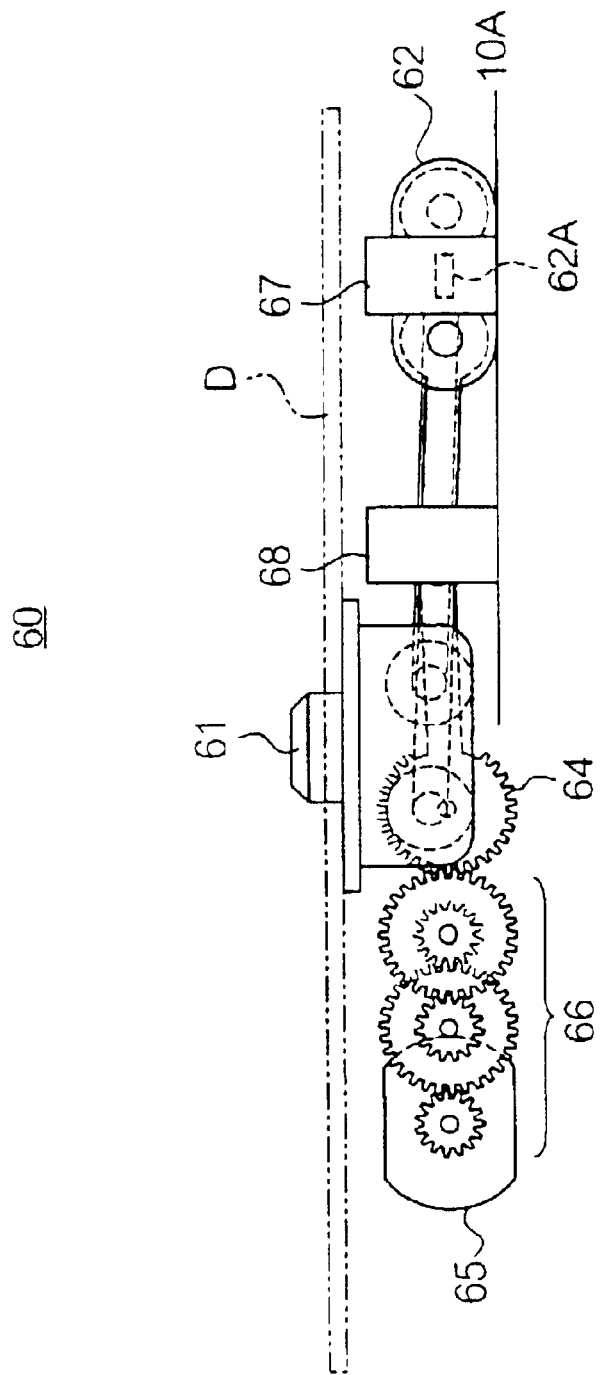
FIG. 6 is a view showing the disk elevator section when a disk holding portion of the elevator section is in an uppermost position.
Figure 7:
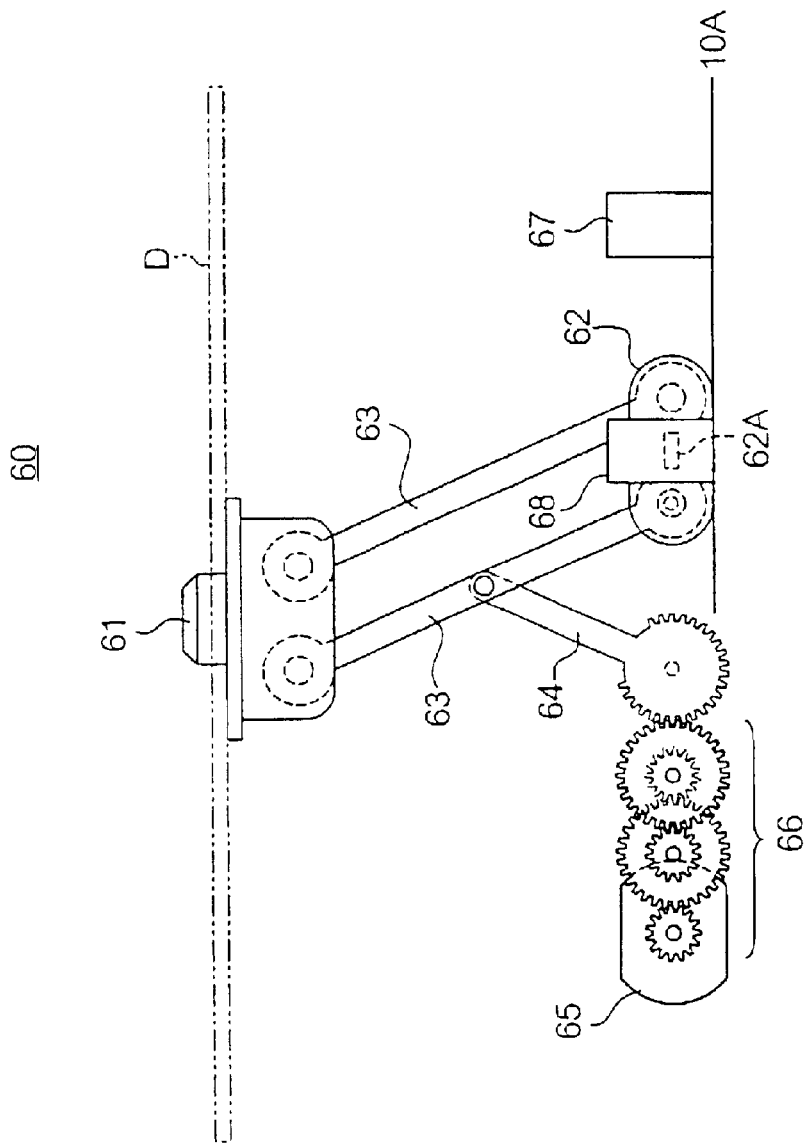
FIG. 7 is a view showing the disk elevator section when the disk holding portion of the elevator section is in a lowermost position.

As also show in FIGS. 6 and 7, the slider 62 has a recessed portion 62A formed in its side surface, and two photo sensor units 67 and 68 are provided, in spaced-apart relation to each other along the moving direction of the slider 62, for detecting a passage of the recessed portion 62A. Specifically, the photo sensor units 67 and 68 are intended to detect a position of the slider 62 when the disk holding portion 61 reaches the lowermost position and a position of the slider 62 when the disk holding portion 61 reaches the uppermost position, respectively. The control section 70 controls the driving condition of the motors 65 on the basis of detected results of the photo sensor units 67 and 68 so that the disk holding portion 61 can be vertically moved appropriately to the lowermost position or uppermost position.

Figure 25:
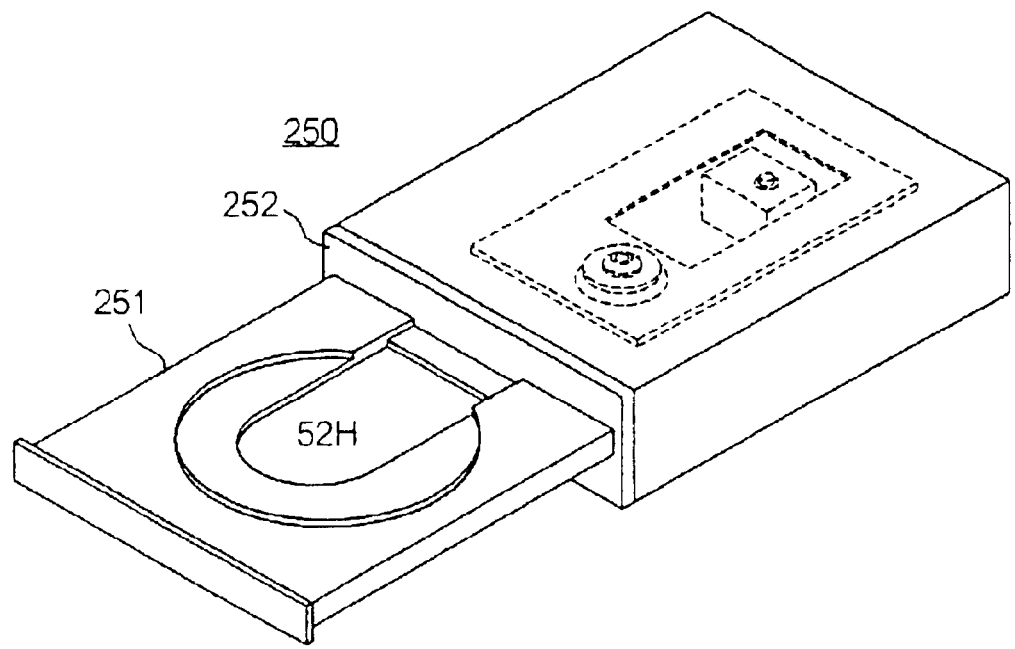
FIG. 25 is a perspective view of a commercially-available tray-type drive device.
Figure 26:
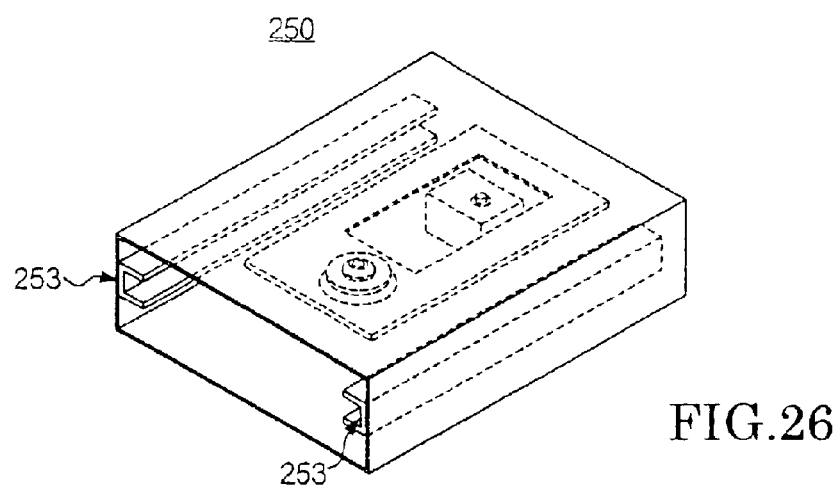
FIG. 26 is a view explanatory of adaptations made on the commercially-available drive device where the drive device is employed in the conventionally-know disk changer apparatus.
Figure 27:
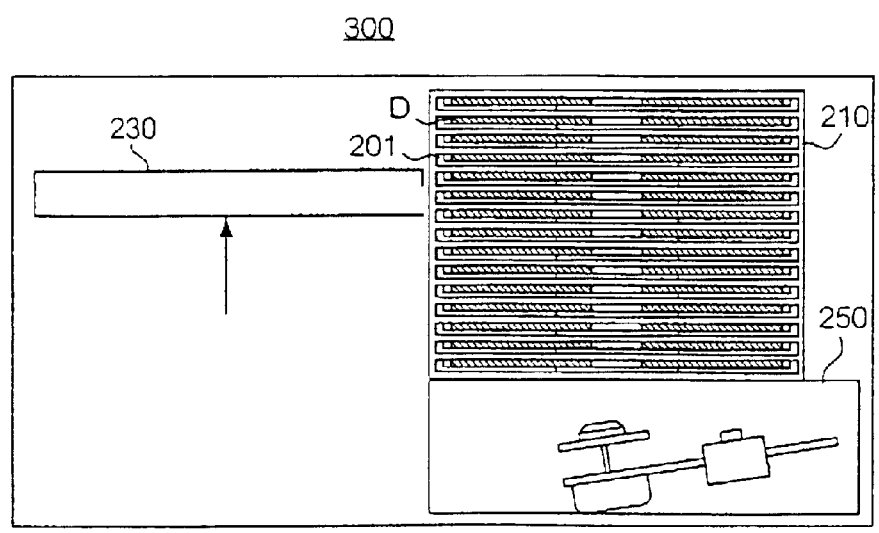
FIG. 27 is a view showing the conventionally-know disk changer apparatus in still another operating state.
Figure 28:
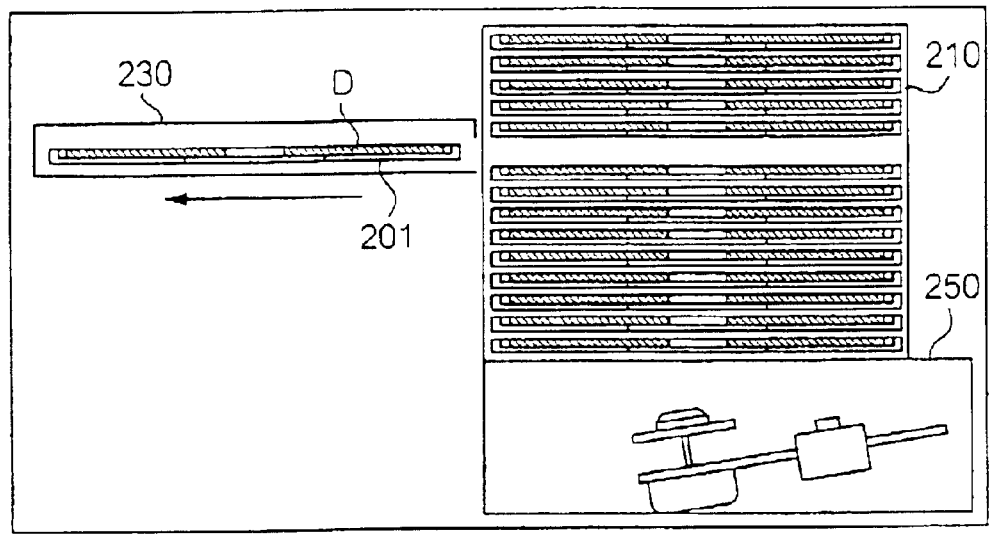
FIG. 28 is a view showing the conventionally-know disk changer apparatus in still another operating state.
Figure 29:
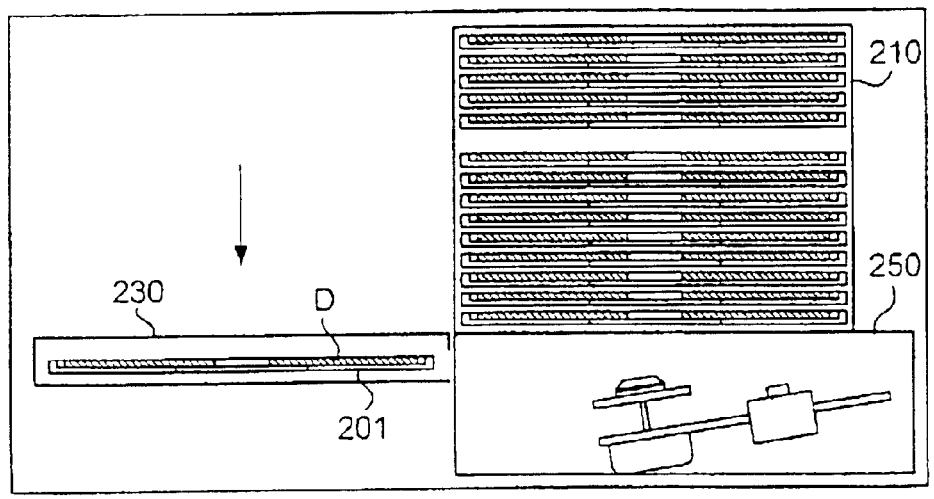
FIG. 29 is a view showing the conventionally-know disk changer apparatus in still another operating state.
Figure 30:
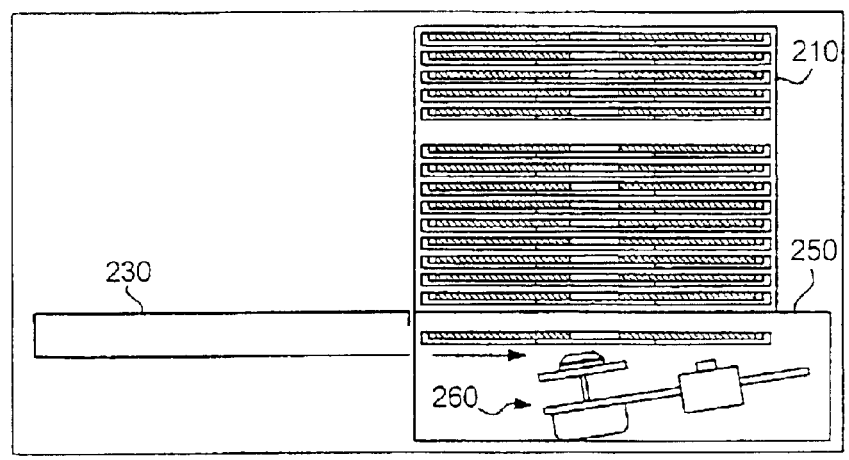
FIG. 30 is a view showing the conventionally-know disk changer apparatus in still another operating state.
Figure 31:
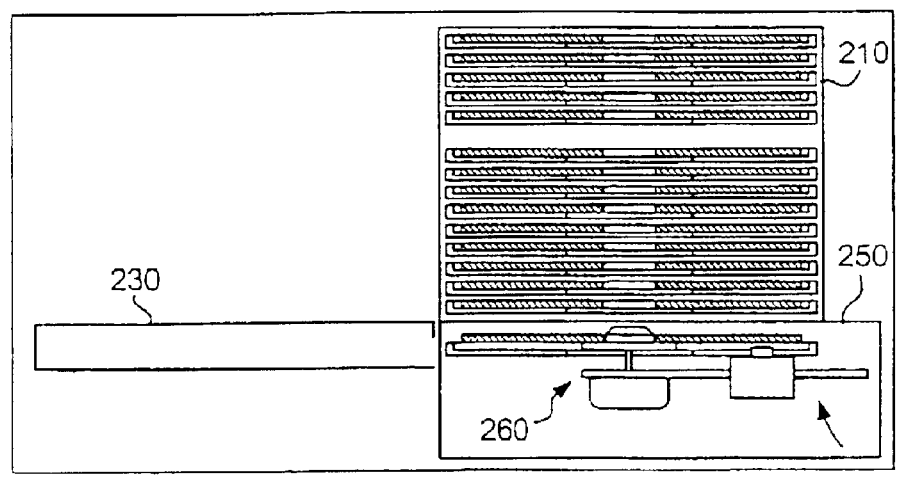
FIG. 31 is a view showing the conventionally-know disk changer apparatus in still another operating state.

Because, as having been stated earlier in relation to FIG. 25, the construction of the commercially-available drive device is such that the disk passed to the sliding tray 251 (51) is set on a turntable and a laser light beam is irradiated onto the recording surface of the disk on the turntable. To permit such laser light beam irradiation onto the recording surface of the disk, the sliding tray 251 (51) has an opening 52H preformed therein.

Figure 8:
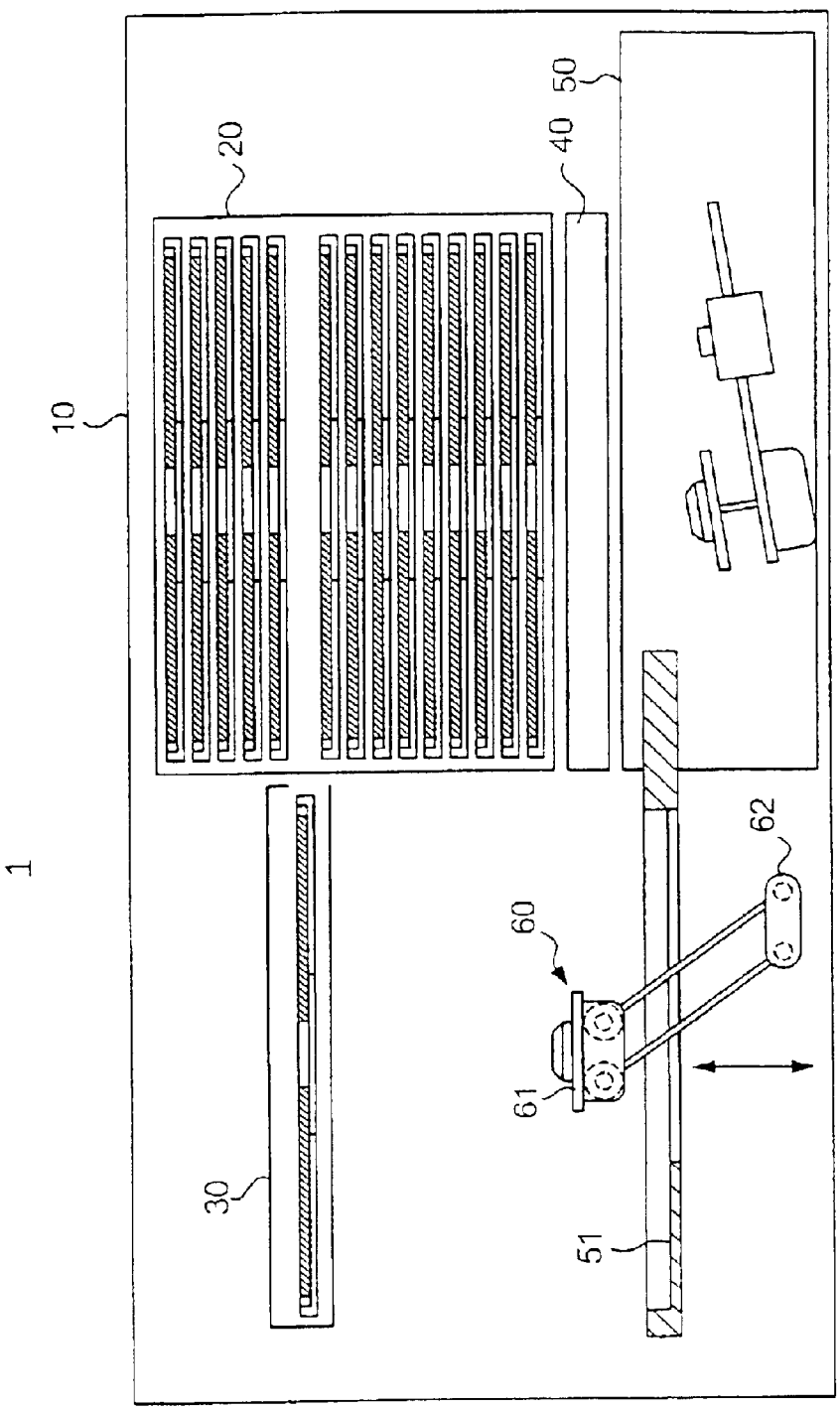
FIG. 8 is a view explanatory of the disk elevator section.
Figure 9:
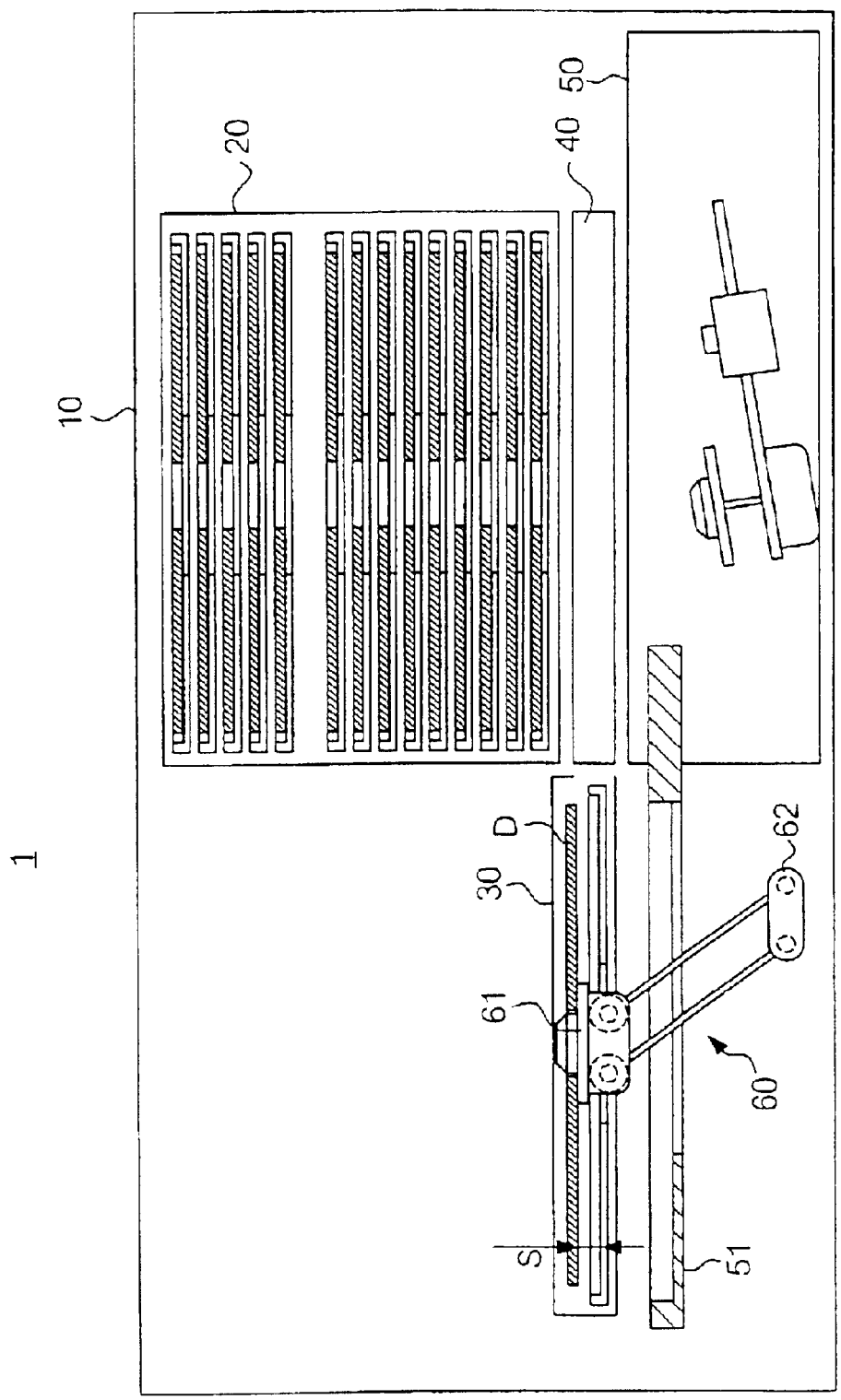
FIG. 9 is also a view explanatory of the disk elevator section.

The aforementioned disk holding portion 61, which may be called a second disk transport section, has a smaller diameter than the opening 52H of the sliding tray 51 of the drive device 50. Thus, even when the sliding tray 51 of the drive device 50 is in the disk takeout position as shown in FIG. 8, the disk holding portion 61 can freely move in the vertical direction through the opening 52H of the sliding tray 51. Also, as shown in FIG. 9, the uppermost position of the disk holding portion 61 is set to an elevation such that the disk D is held on the disk holding portion 61 slightly above the carrying tray 21 (i.e., at a slight distance S from the upper surface of the carrying tray 21) when the disk transport section 30 is in the tray delivery position. Note that the disk holding portion 61 is controlled to normally standby in the lowermost position shown in FIG. 6.

(1.2) Behavior of the Embodiment:

Next, with reference to FIGS. 10–17, a description will be made about behavior of the disk changer apparatus 1 when a designated one of the disks D stored in the disk storage section 20 is transported to the drive device 50. Instruction as to which of the disks D is to be transported may be input from external equipment via the control section 70 or by manipulation of an operator (not shown) provided on the disk changer apparatus 1.

Figure 10:
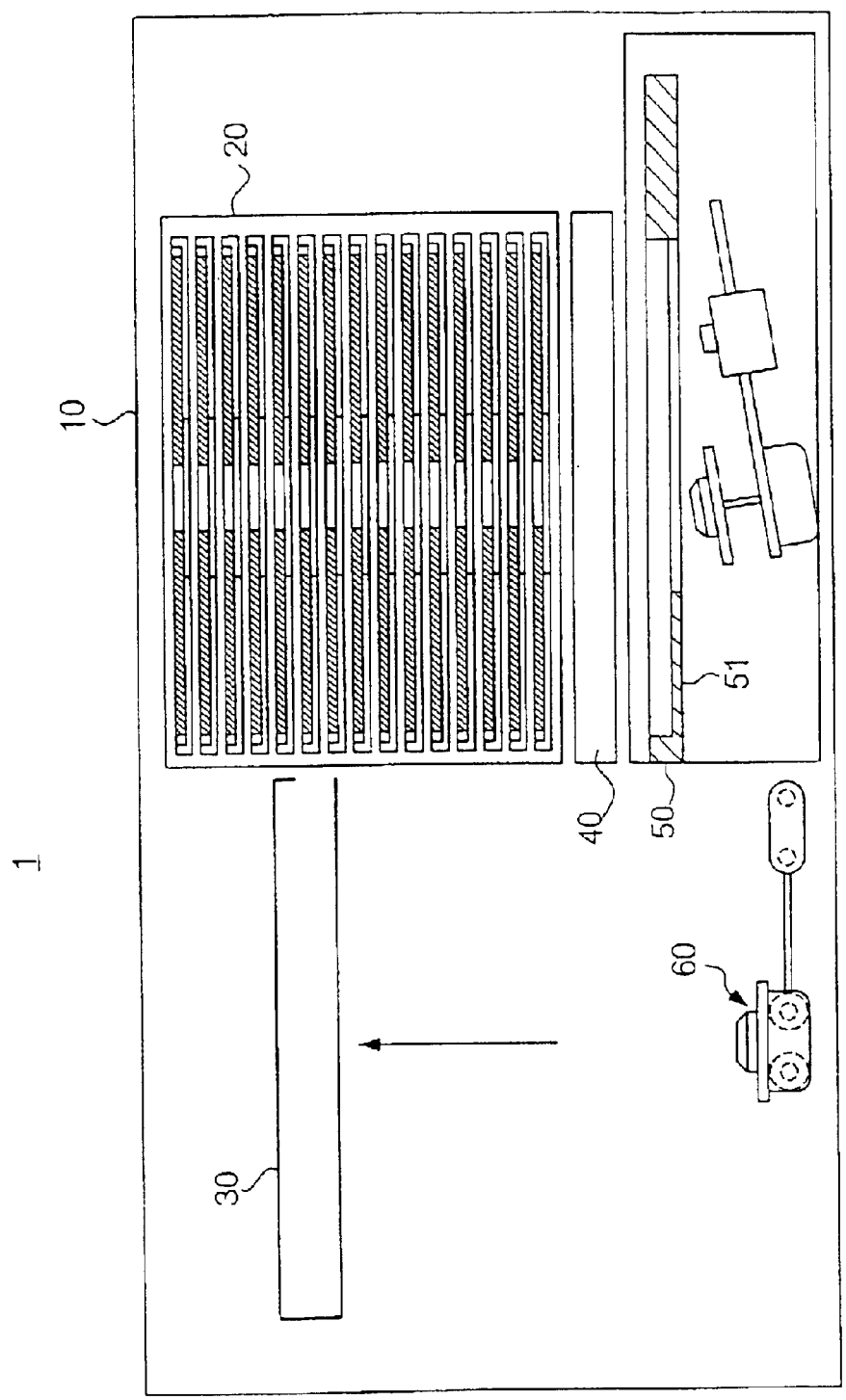
FIG. 10 is a view showing the disk changer apparatus in one operating state thereof.

First, in the disk changer apparatus 1, the control section 70 causes the disk transport section 30 to move upward or downward so as to face the carrying tray 21 of the designated disk D to be transported, as shown in FIG. 10. Once it is detected that the disk transport section 30 has come to a position facing the tray 21 of the to-be-transported disk D, the control section 70 causes the disk transport section 30 to stop at that position.

Figure 11:
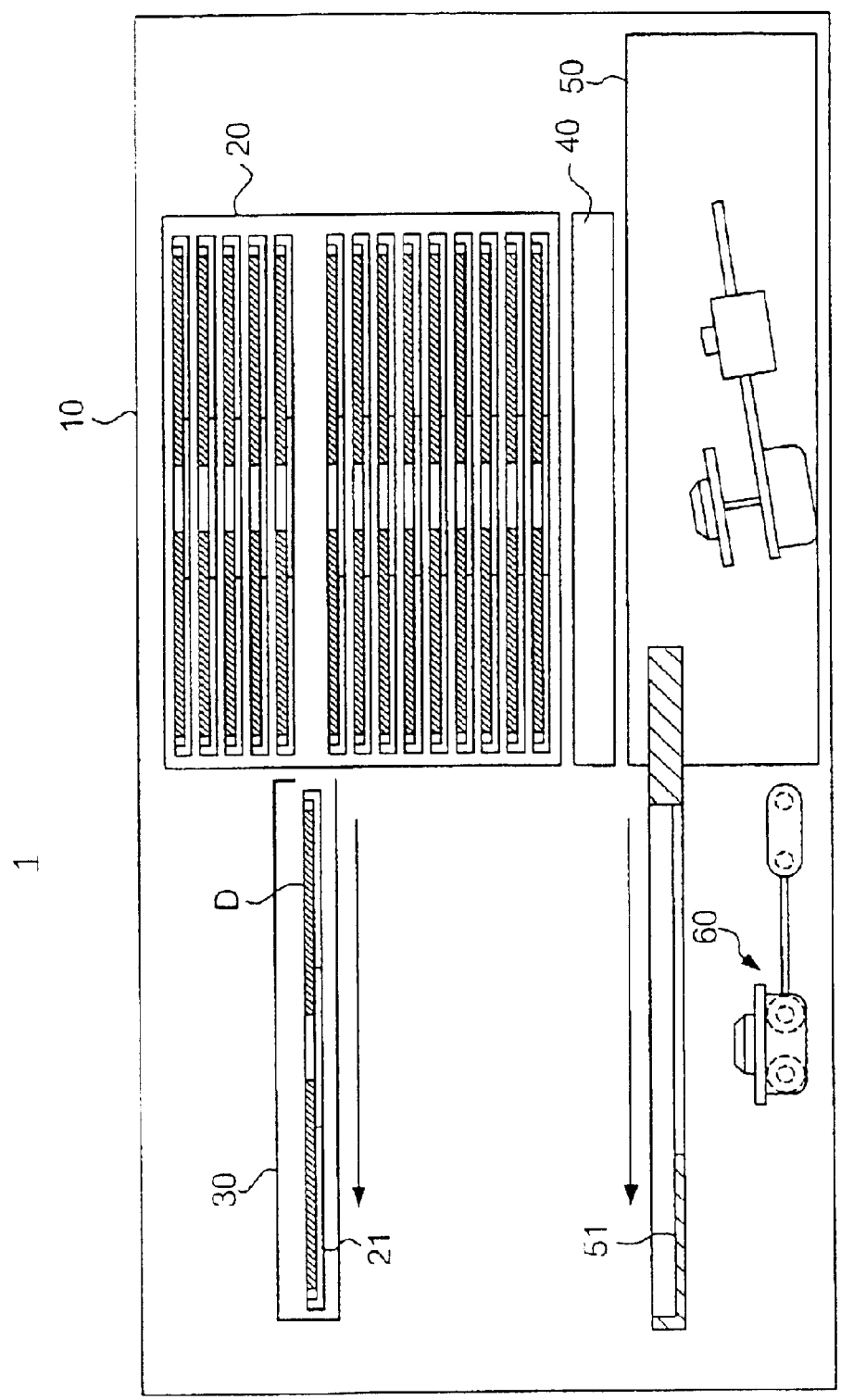
FIG. 11 is a view showing the disk changer apparatus in another operating state.

Then, as shown in FIG. 11, the control section 70 causes the tray transfer mechanism of the disk transport section 30 to draw the designated disk D and corresponding carrying tray 21 into the disk transport section 30. The control section 70 also causes the sliding tray 51 of the disk drive 50 to advance to the disk takeout position, simultaneously with or immediately before or after the drawing of the disk D and corresponding carrying tray 21 from the storage section 20 into the transport section 30.

Figure 12:
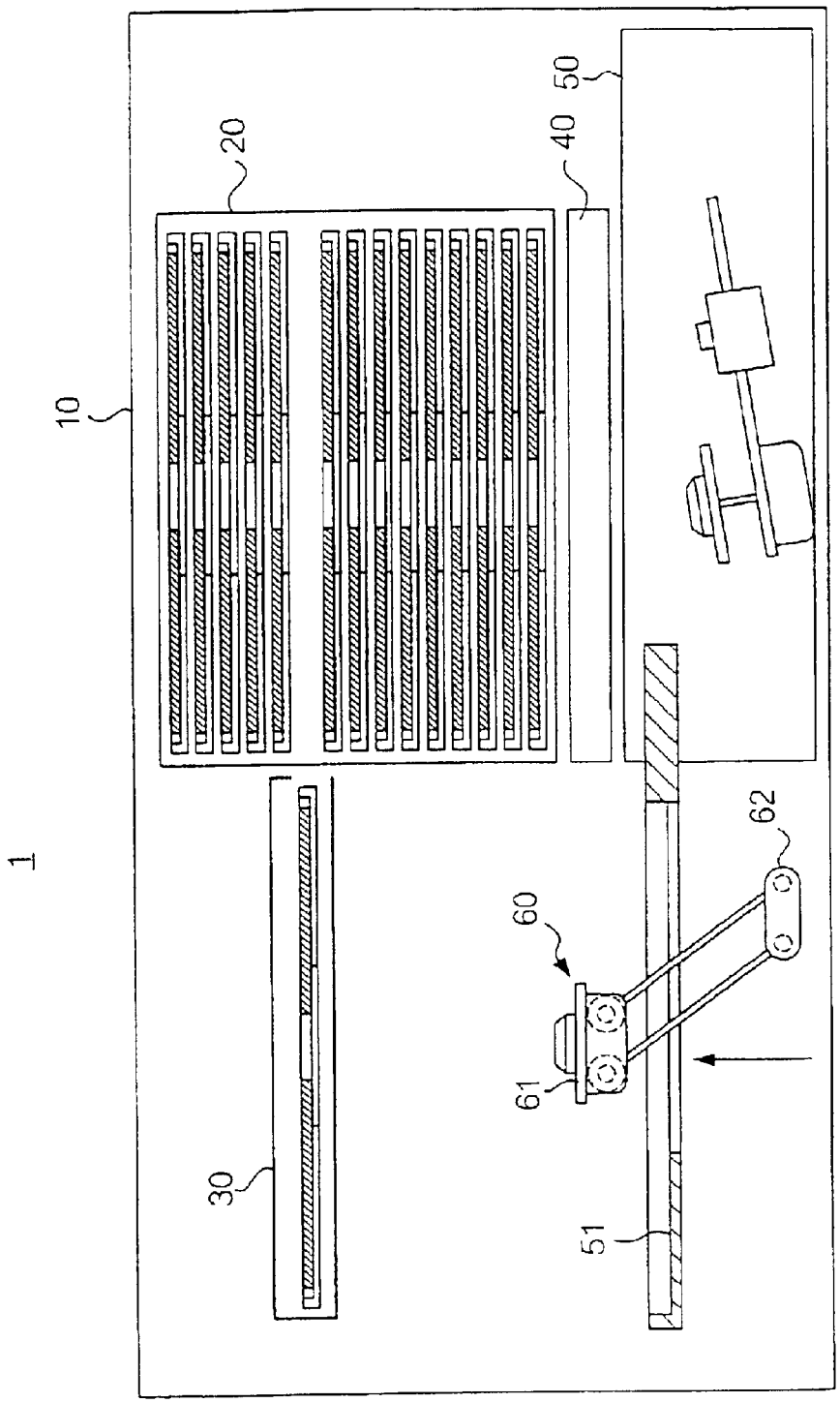
FIG. 12 is a view showing the disk changer apparatus in still another operating state.

Then, upon detecting that the carrying tray 21 has been completely received in the disk transport section 30 and the sliding tray 51 of the drive device 50 has been completely brought to the takeout position, the control section 70 drives the disk elevator section 60 to raise the disk holding portion 61 to the predetermined uppermost position as shown in FIG. 12.

Figure 13:
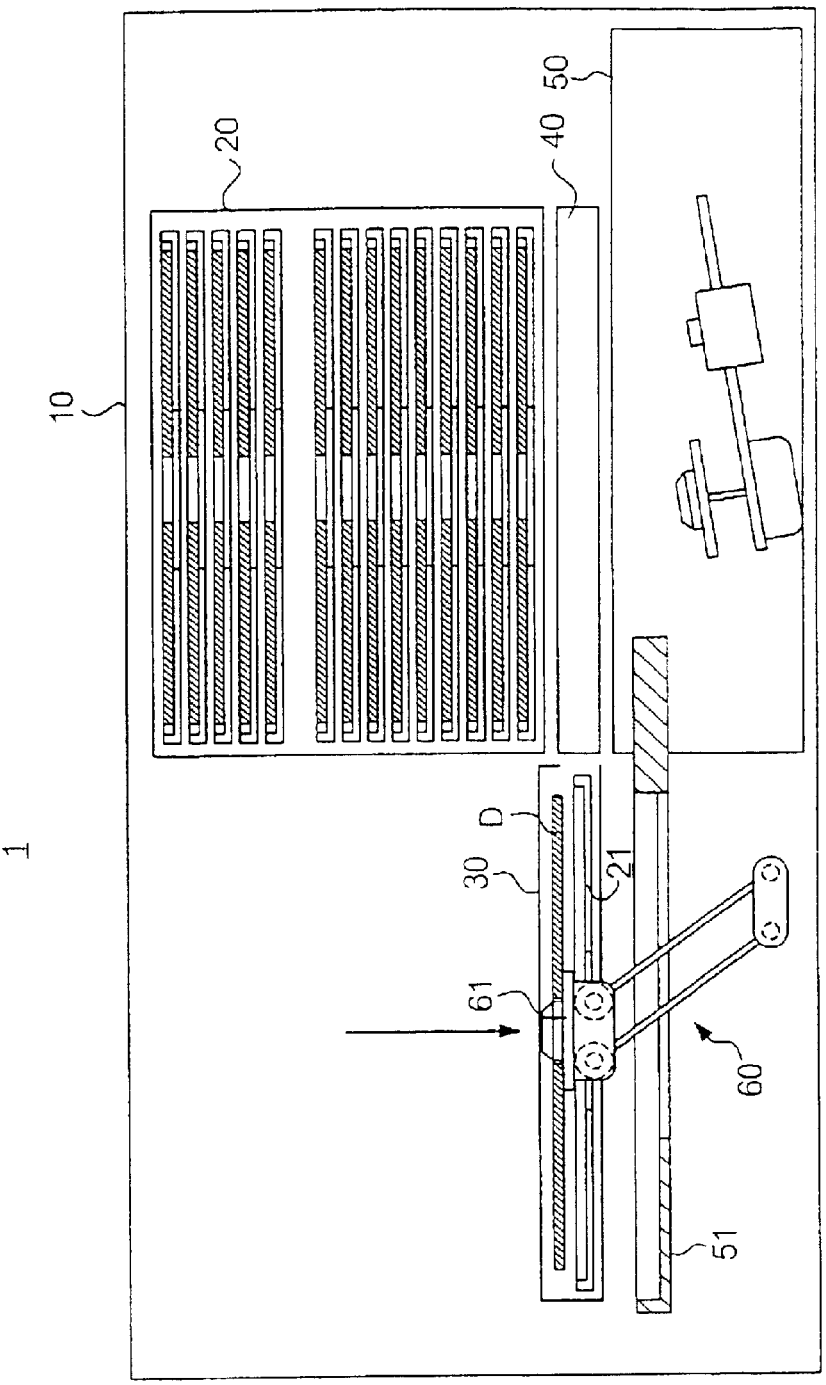
FIG. 13 is a view showing the disk changer apparatus in still another operating state.

Then, once the disk holding portion 61 has been raised to predetermined uppermost position through the opening 52H of the sliding tray 51, the control section 70 moves the disk transport section 30 to the position facing the temporary tray keeping section 40 (i.e., tray delivery position) as shown in FIG. 13. At that time, only the designated disk D, of the pair of the designated disk D and carrying the tray 21 received in the disk transport section 30, is placed onto the disk holding portion 61 in the uppermost position immediately before the disk transport section 30 completely reaches the tray delivery position, so that the disk D can be positioned at the distance S from the upper surface of the corresponding carrying tray 21.

Figure 14:
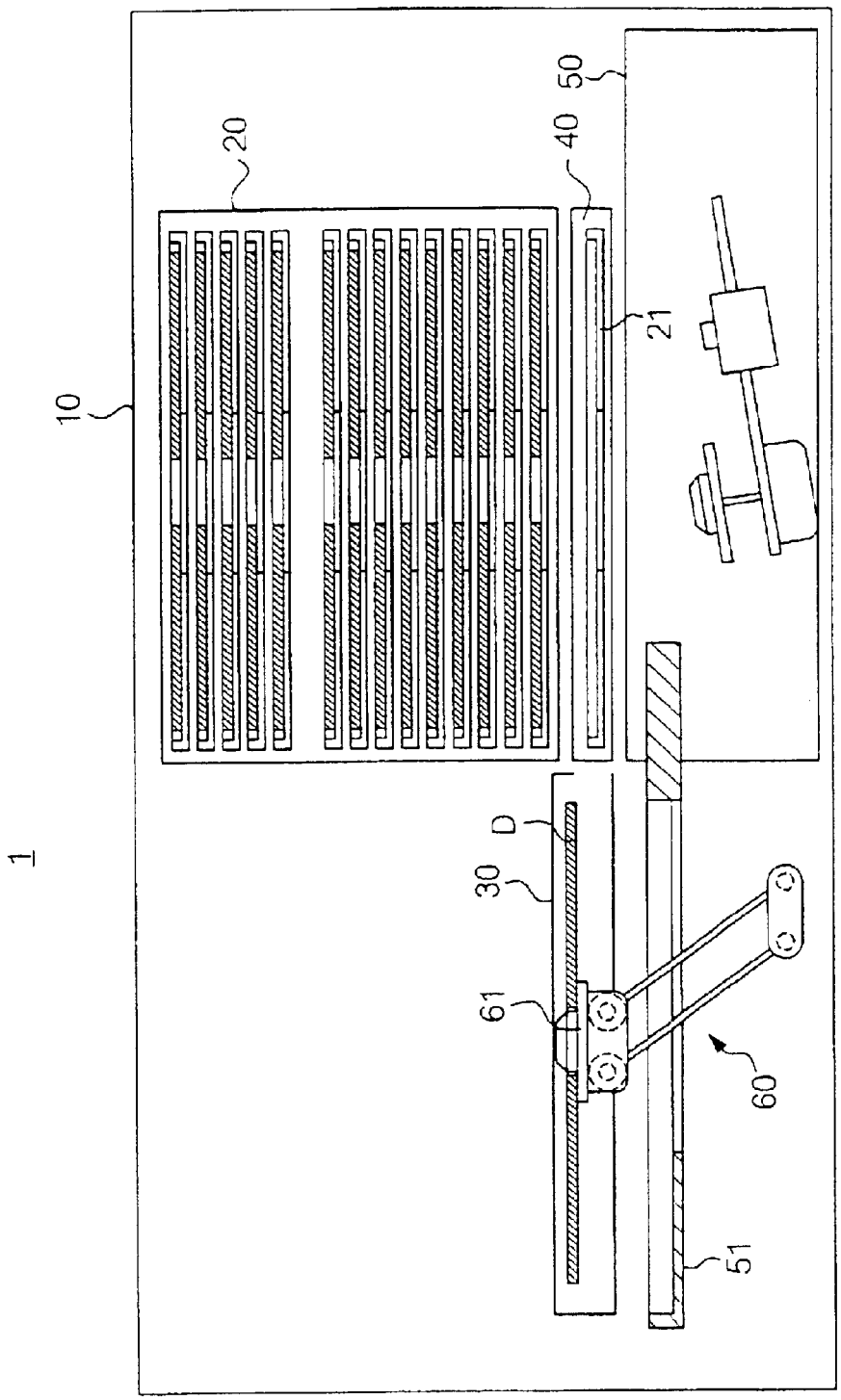
FIG. 14 is a view showing the disk changer apparatus in still another operating state.

Then, upon detecting that the disk transport section 30 has completely reached the tray delivery position, the control section 70 causes the tray transfer mechanism of the disk transport section 30 to transfer the carrying tray 21 from the disk transport section 30 into the temporary tray keeping section 40 as illustrated in FIG. 14. Because the designated disk D is now held on the disk holding portion 61 at the slight distance S from the upper surface of the corresponding tray 21 as noted above, only the carrying tray 21 of the designated disk D can be stored into the temporary tray keeping section 40. Note that the opening 21H preformed in the carrying tray 21, as illustrated in FIG. 3, allows the carrying tray 21 to be freely transferred into the temporary tray keeping section 40 without being interfered by the disk holding portion 61.

Figure 15:
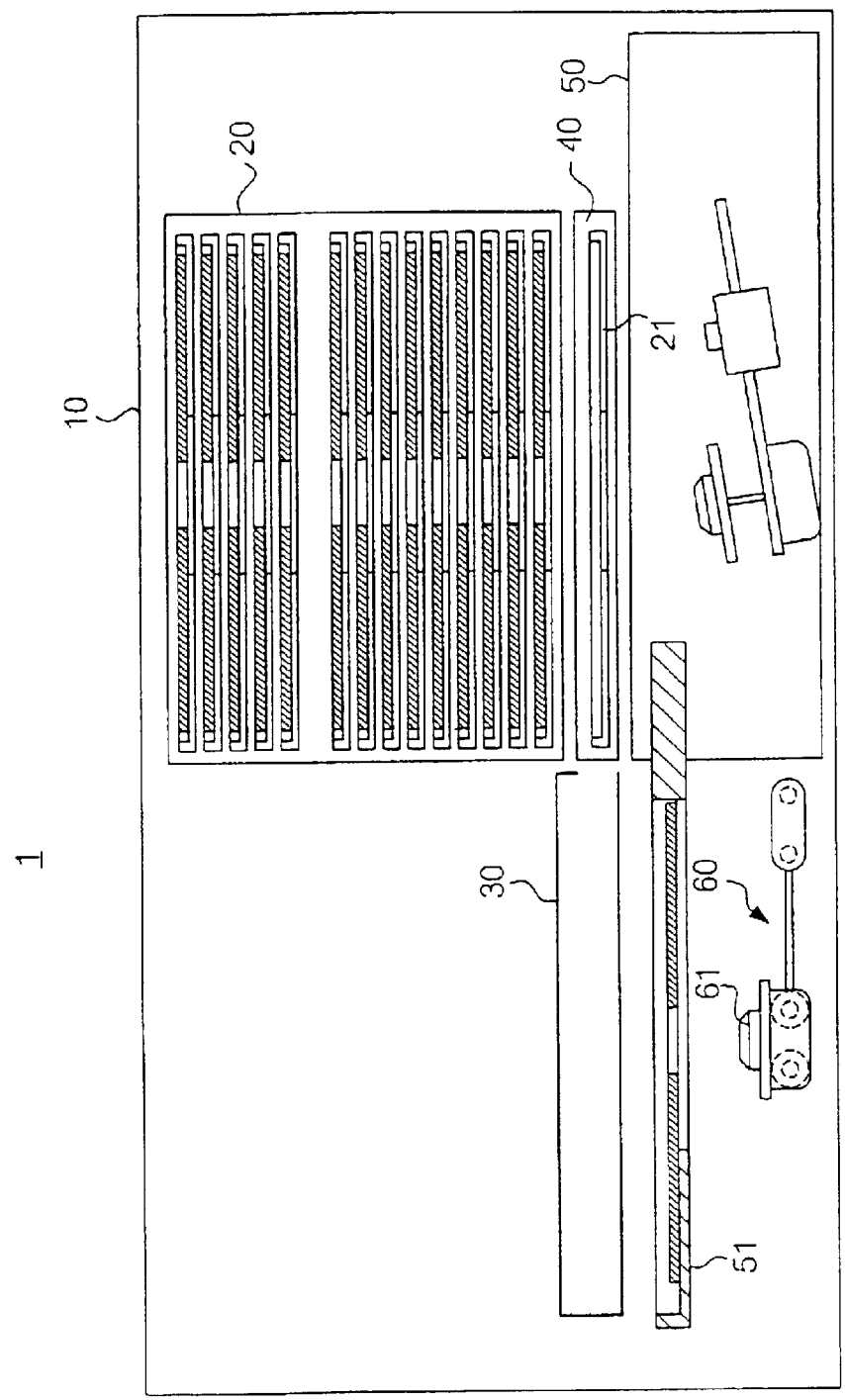
FIG. 15 is a view showing the disk changer apparatus in still another operating state.

Then, upon detecting that the carrying tray 21 has been completely moved out of the disk transfer section 30, the control section 70 stores the tray 21 into the temporary tray keeping section 40, and it moves the disk holding portion 61 downward to the lowermost position, as shown in FIG. 15, to thereby place the disk D, having been held on the holding portion 61, onto the sliding tray 51.

Figure 16:
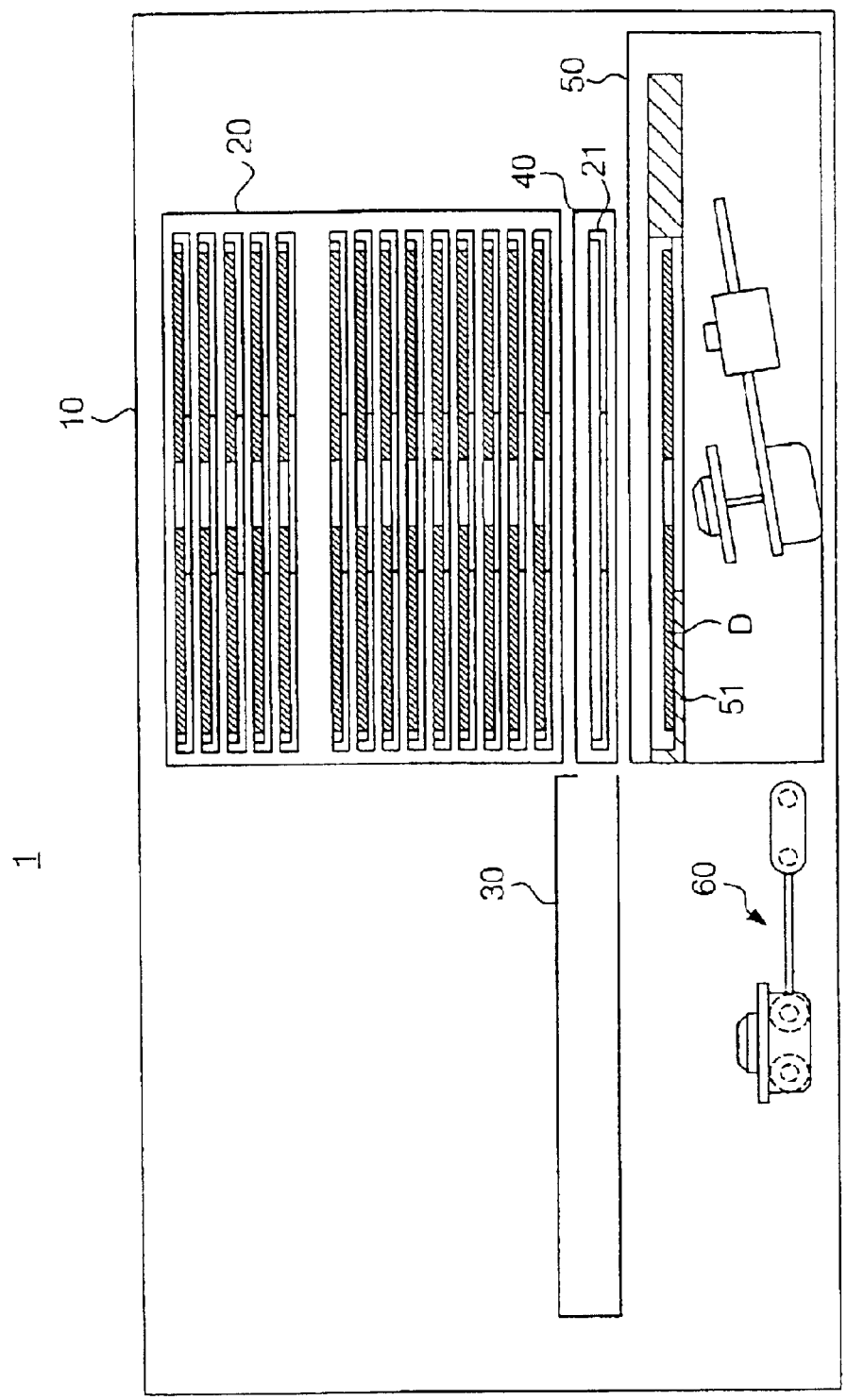
FIG. 16 is a view showing the disk changer apparatus in still another operating state.
Figure 17:
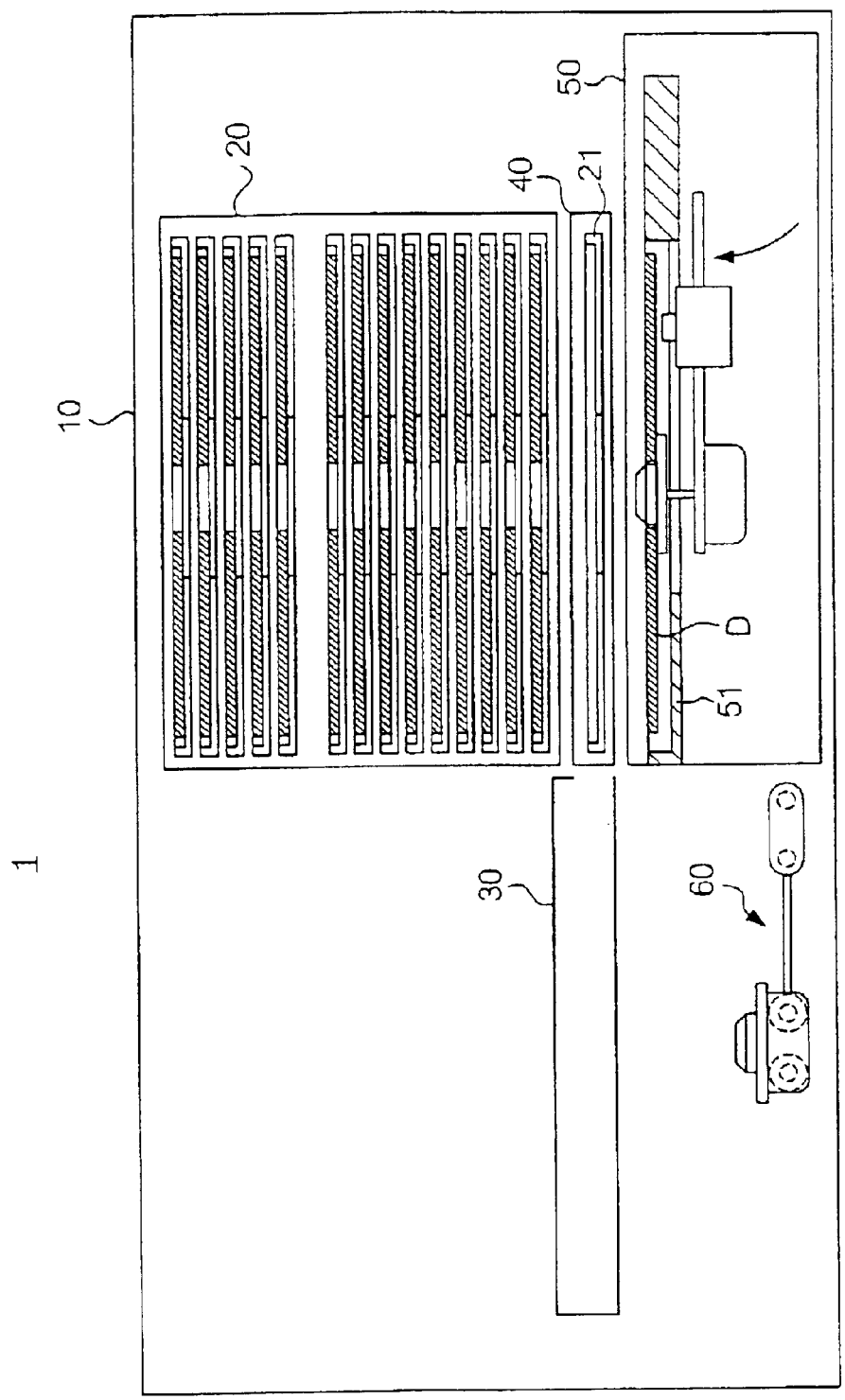
FIG. 17 is a view showing the disk changer apparatus in still another operating state.
Figure 18:
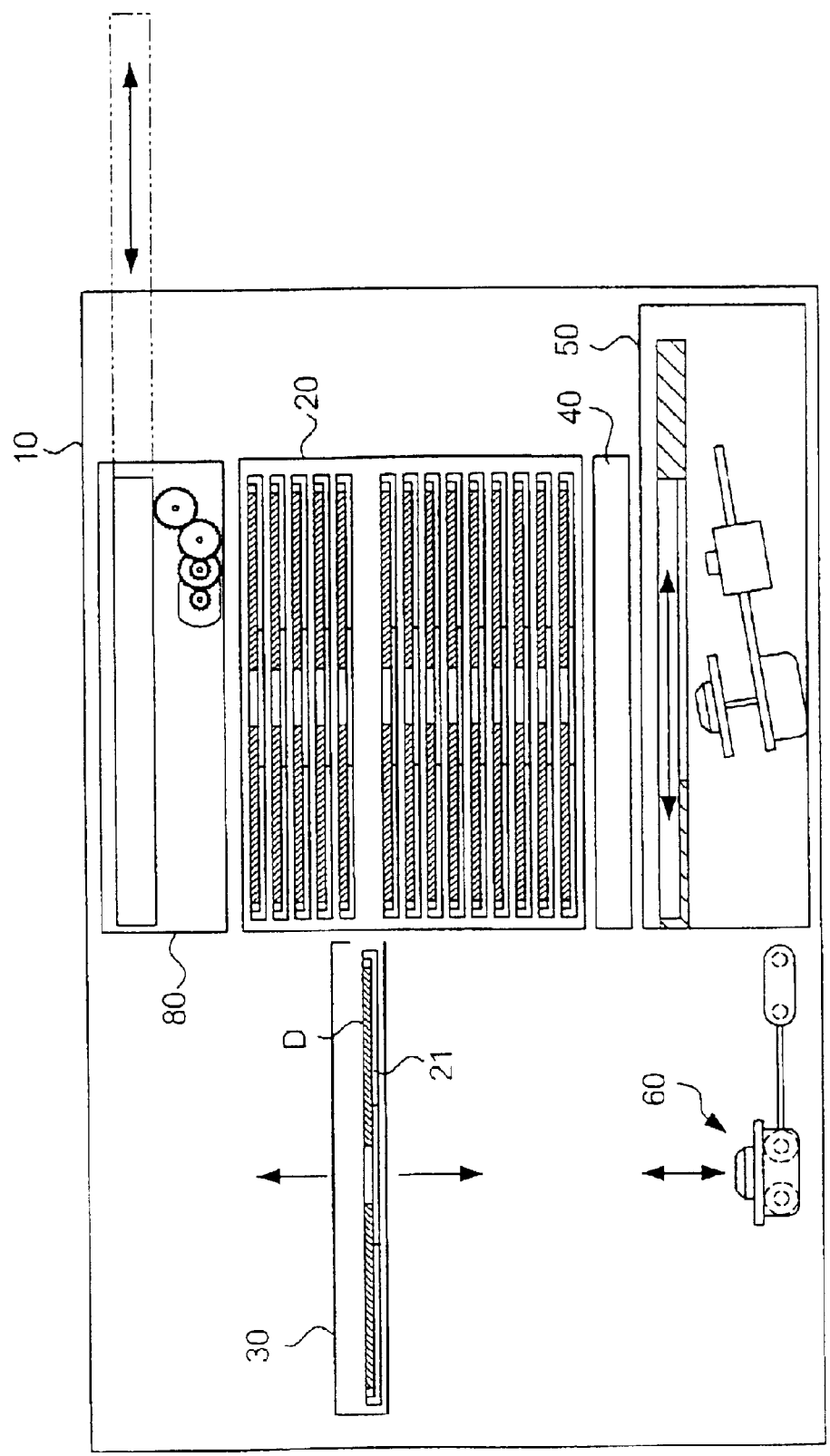
FIG. 18 is a view showing a modification of the disk changer apparatus of the present invention.

After that, the control section 70 causes the sliding tray 51 and disk D placed thereon to retract into the interior of the drive device 50 as illustrated in FIG. 16, so that the disk D is set on the turntable of the drive device 50 as illustrated in FIG. 17.

In the above-described manner, the disk changer apparatus 1 can transport, to the drive device 50, any desired one of the disks D stored in the disk storage section 20 so that information is read out or written from or to the desired disk D by means of the drive device 50.

To transport the disk D from the drive device 50 back to the disk storage section 20, the control section 70 controls the various components of the disk changer apparatus 1 in order opposite to the above-described.

(1.3) Benefits Achievable by the Embodiment:

As described above, the embodiment of the disk changer apparatus 1 is constructed in such a manner that the disk holding portion 61 of the disk elevator section 60 is vertically movable through the opening preformed in the sliding tray 51 of the drive device 50 and the disk elevator section 60 permits transfer of a designated disk D between the disk transport section 30 and the sliding tray 51 utilizing the preformed opening of the sliding tray 51. As a consequence, the disk changer apparatus 1 can employ a desired commercially-available drive device as its drive device 50 without having to make substantial adaptations on the commercially-available drive device.

Further, because the disk holding portion 61 is movable in the vertical direction, the disk elevator section 60 need not have high positional precision in a direction of the height of the sliding tray 51. Briefly stated, it is only necessary that the drive device 50 be positioned in such a manner that the sliding tray 51 can be freely moved into and out of the drive device 50 above the disk holding portion 61 held in the lowermost position. As a result, the embodiment can advantageously employ any one of a great variety of commercially-available drive devices with their respective sliding trays 51 of various different heights.

Therefore, the disk changer apparatus 1 of the present invention can eliminate a need for modifying the positions, sizes, etc. of the various components to adapt to one particular type of drive device to be employed. As a consequence, the disk changer apparatus 1 of the invention can employ a commercially-available drive device that has optimal conditions, such as optimal performance and cost and instant availability, at the time of initiation of manufacture of the apparatus. Also, the disk changer apparatus 1 of the invention can employ a plurality of types of drive devices in combination. Stated differently, the drive device 50 of the disk changer apparatus 1 can be readily replaced with another one, and the manufacturer of the disk changer apparatus 1 can promptly perform necessary operations for replacing or repairing the drive device 50; even the user of the disk changer apparatus 1 can readily replace the drive device 50 with another desired drive device.

(2) Modifications

It should be appreciated that the present invention is not limited to the above-described embodiment and various modifications of the invention are also possible as will be set forth below.

(2.1) First Modification:

In the above-described embodiment, when the user wants to replace disks D in the disk storage section 20, it is necessary to remove the entire disk storage section 20 out of the housing of the disk changer apparatus 1. As a modification, the disk changer apparatus 1 may contain a tray device 80 to allow the disk transport section 30 to deliver and receive a designated disk D and corresponding carrying tray 21 to and from the tray device 80, so that the user can replace the designated disk D with another one without having to removing the entire disk storage section 20 out of the housing of the disk changer apparatus 1.

Figure 19:
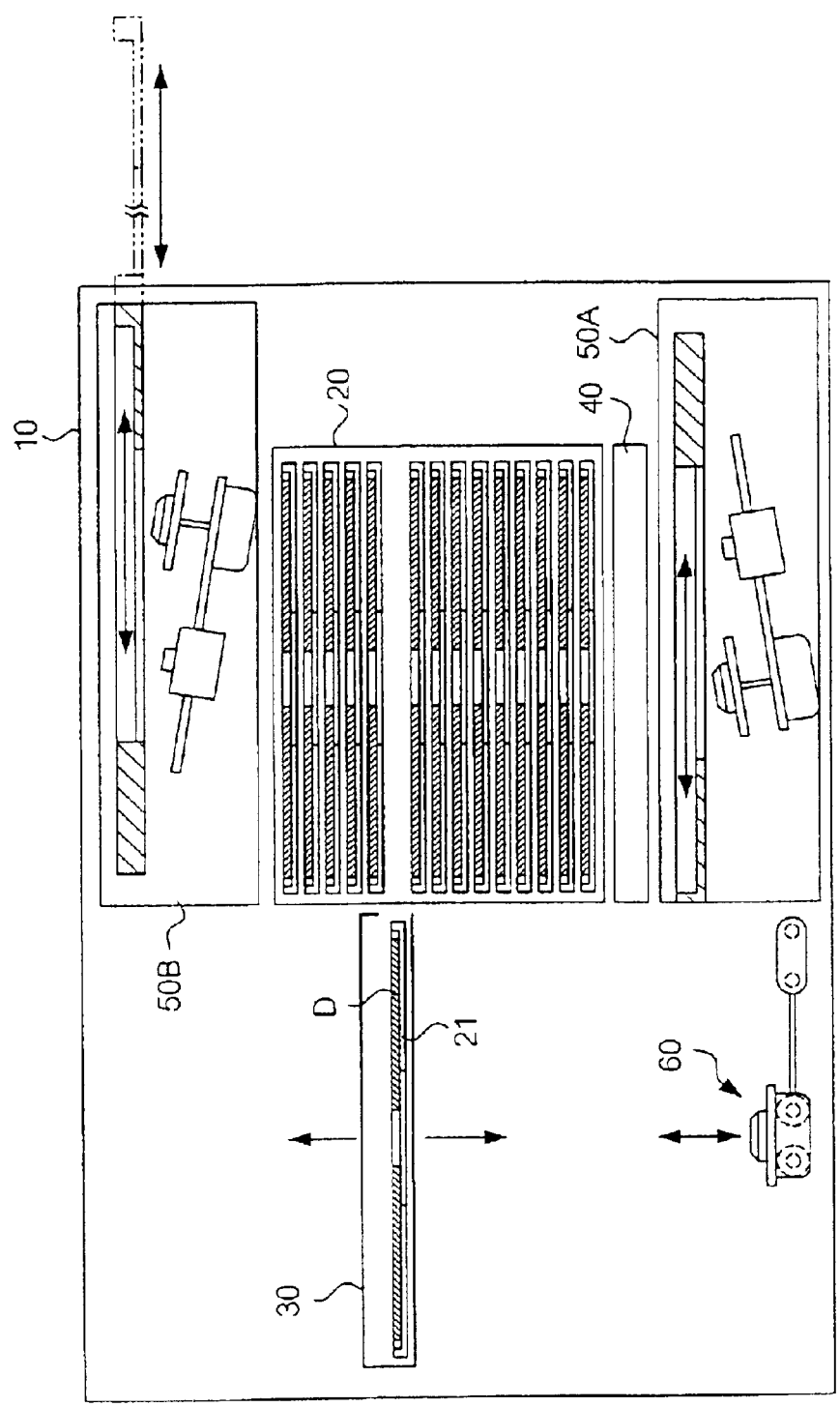
FIG. 19 is a view showing another modification of the disk changer apparatus of the present invention.

(2.2) Second Modification:

Whereas the embodiment has been described above in relation to the case where the basic principles of the invention are applied to the disk changer apparatus 1 employing just one drive device 50, the disk changer apparatus 1 may be provided with a first drive device 50A dedicated to recording and a second drive device 50B dedicated to reproduction, as illustrated in FIG. 19, so that the apparatus 1 can function as a copying machine. Further, if the positions of the recording-only drive device 50A and reproduction-only drive device 50B in FIG. 19 are reversed, the apparatus 1 can function as a copying machine for copying desired portions of many disks D.

Figure 20:
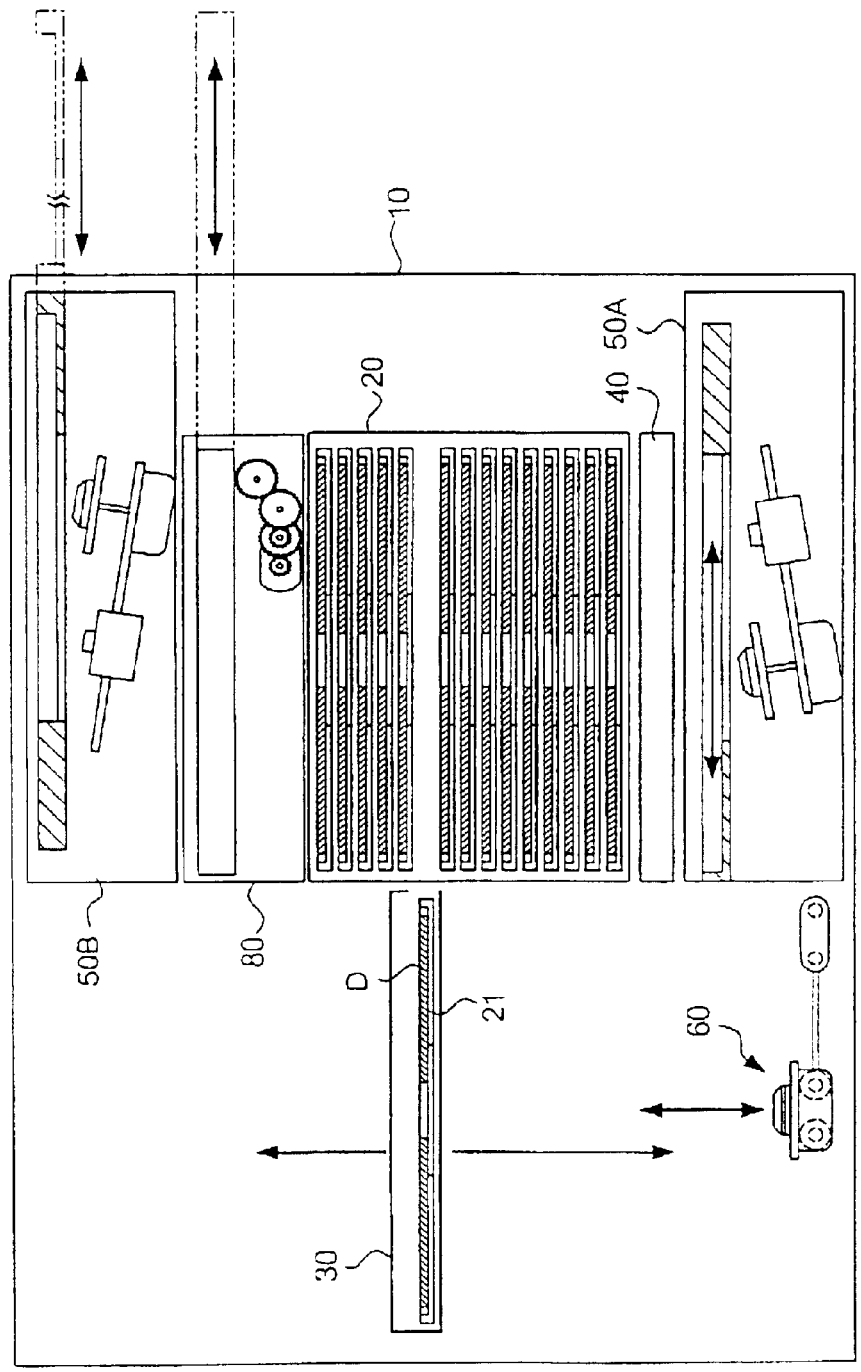
FIG. 20 is a view showing still another modification of the disk changer apparatus of the present invention.
Figure 21:
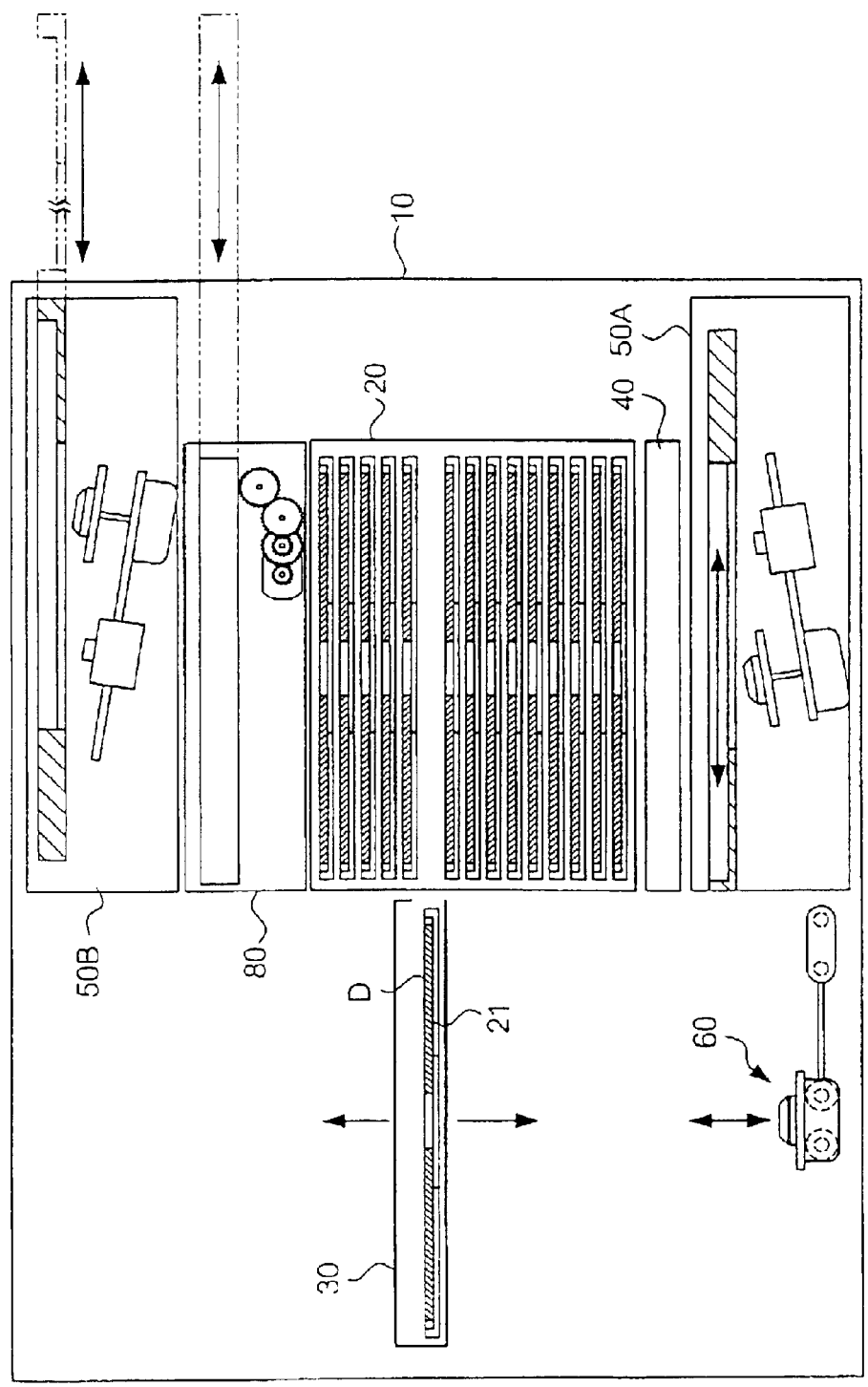
FIG. 21 is a view showing still another modification of the disk changer apparatus of the present invention.
Figure 22:
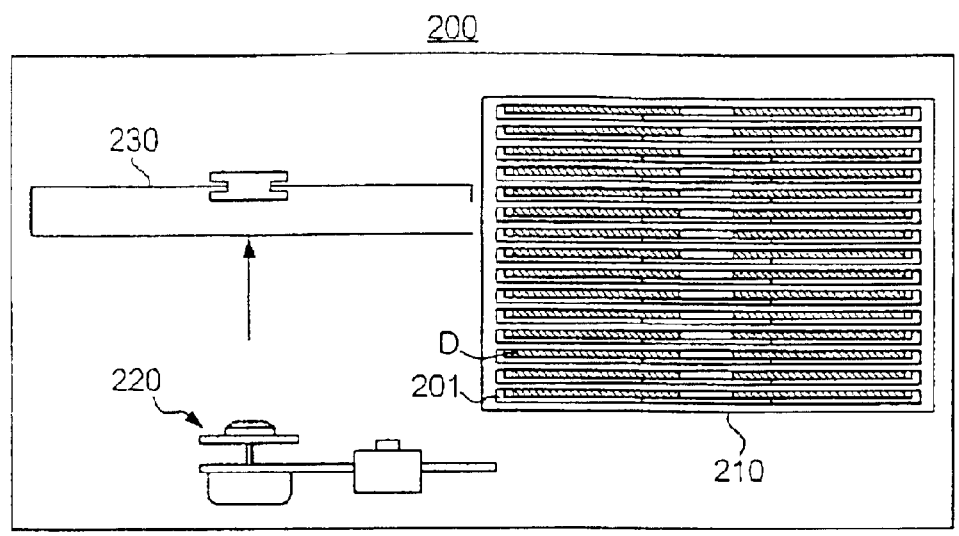
FIG. 22 is a view showing a conventionally-know disk changer apparatus in one operating state thereof.
Figure 23:
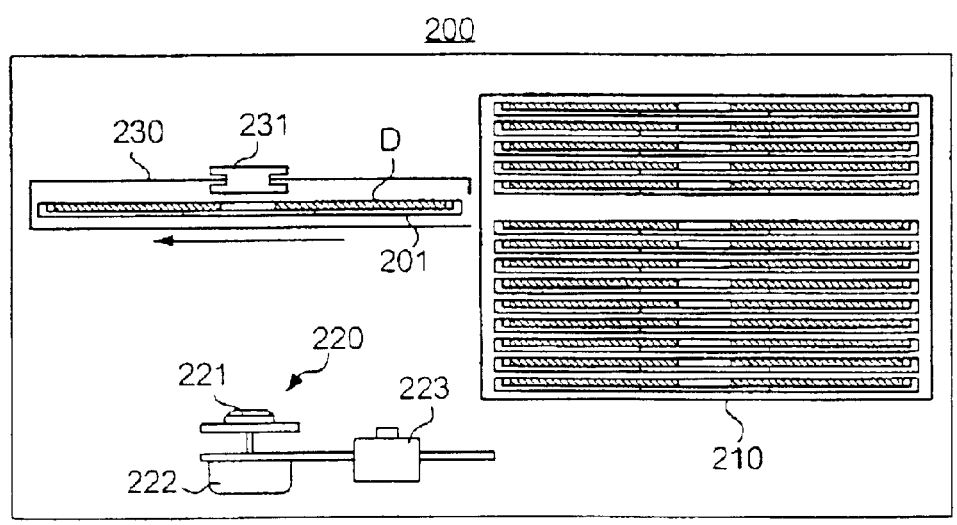
FIG. 23 is a view showing the conventionally-know disk changer apparatus in another operating state.
Figure 24:
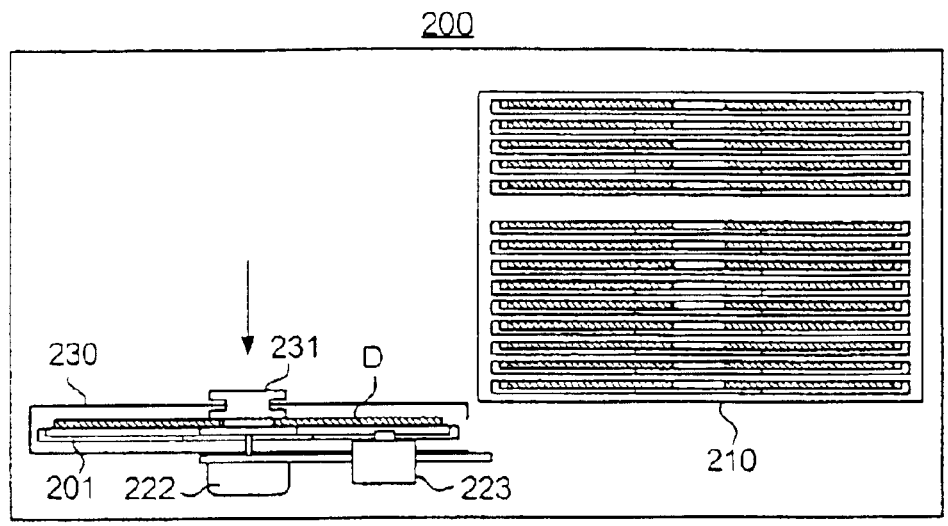
FIG. 24 is a view showing the conventionally-know disk changer apparatus in still another operating state.

Furthermore, the disk changer apparatus 1 shown in FIG. 19 may contain a tray device 80 as illustrated in FIG. 20. Moreover, the disk changer apparatus 1 may contain a drive device 50C capable of functioning as both a tray device and a reproduction-only drive device (or recording-only drive device or recording/reproducing drive device), as illustrated in FIG. 21, so that the disk changer apparatus 1 of FIG. 21 can be significantly reduced in the overall size and in the necessary number of component parts while still securing similar functions to the disk changer apparatus of FIG. 20.

In summary, the present invention having been described so far can employ a commercially-available drive device without having to make substantial adaptations on the commercially-available drive device and also allows the drive device to be replaced with ease.

What is claimed is:

1. A disk changer apparatus comprising:

a drive device for reading or writing information from or to a disk loaded on a sliding tray of said drive device by irradiating a light beam onto the disk through an opening formed in said sliding tray;

a disk storage section for storing a plurality of disks supported on respective carrying trays;

a tray keeping section for temporarily keeping the carrying tray of a given disk;

a first transport section that receives, from said disk storage section, a designated disk along with the respective carrying tray supporting thereon the designated disk and then transports the designated disk and respective carrying tray to a predetermined position adjacent to said tray keeping section to thereby pass the carrying tray of the designated disk to said tray keeping section; and a second transport section that receives only the designated disk from said first transport section having transported the designated disk and respective carrying tray to the predetermined position, and then passes the designated disk to said sliding tray of said drive device.

2. A disk changer apparatus as claimed in claim 1 wherein, when said first transport section passes the carrying tray of the designated disk to said tray keeping section, said second transport section separates the designated disk from the respective carrying tray so that said second transport section can receive only the designated disk and said tray keeping section can keep only the carrying tray of the designated disk.

3. A disk changer apparatus as claimed in claim 1 wherein, when said sliding tray is in an advanced position projecting from said drive device, said second transport section is movable through the opening of said sliding tray to permit transfer of the designated disk between said first transport section and said sliding tray.

4. A disk changer apparatus as claimed in claim 1 wherein the carrying tray has an opening formed therein to extend from a center of the disk to be supported thereon to an outer peripheral edge portion of the disk.

* * * * *